US00RE42089E

(19) United States
(12) Reissued Patent
Holmes

(10) Patent Number: US RE42,089 E
(45) Date of Reissued Patent: Feb. 1, 2011

(54) VISUAL CALIBRATION TARGET SET METHOD

(76) Inventor: Joseph Holmes, 11 Highland Blvd., Kensington, CA (US) 94707

(21) Appl. No.: 11/347,787

(22) Filed: Feb. 3, 2006

Related U.S. Patent Documents

Reissue of:
(64) Patent No.: 6,686,953
Issued: Feb. 3, 2004
Appl. No.: 09/797,897
Filed: Mar. 1, 2001

U.S. Applications:
(60) Provisional application No. 60/185,969, filed on Mar. 1, 2000.

(51) Int. Cl.
*H04N 17/00* (2006.01)
*H04N 17/02* (2006.01)

(52) U.S. Cl. ..... 348/179; 348/181
(58) Field of Classification Search ..... 348/179–188, 348/806, 807, 745–747, 657, 658, 674
See application file for complete search history.

(56) References Cited

U.S. PATENT DOCUMENTS 4,106,846 A * 8/1978 Russin ..... 348/179
4,914,506 A * 4/1990 Kafer et al. ..... 348/182
5,298,993 A * 3/1994 Edgar et al. ..... 348/180
5,381,349 A * 1/1995 Winter et al. ..... 382/167
5,483,259 A * 1/1996 Sachs ..... 345/600
5,638,117 A * 6/1997 Engeldrum et al. ..... 348/179

OTHER PUBLICATIONS

Adobe Systems Incorporated, "Gamma Read Me" (printout of electronic file of that name), Jan. 1997.

Candela, Ltd., "Gamma Estimation Test Pattern," 1998.

* cited by examiner

*Primary Examiner*—M. Lee
(74) *Attorney, Agent, or Firm*—Larry D. Johnson

(57) ABSTRACT

A novel process of visual calibration of a computer display or the like in volves adjusting the appearance and relative appearance of targets and su targets displayed on the display. An objective method is provided for determining the precisely optimal brightness setting for CRT displays, which method is also applicable to the setting of the "Black Level" control on some FPDs. A precise method is provided to visually determine conformity of a display's tonality to a given standard tone curve, for example a gamma 1.8 curve, which is embodied in one of the preferred calibration target sets. The need to sense and therefore be able to control and to verify the correct gray balance of the entire tone scale of the display is met. The problem of verifying the similarity of the tone curve in the display profile and that of the actual calibration is solved. By converting a preferred RGB gamma target into CIE Lab image data through an ideal display profile of the correct gamma, a new kind of target is taught.

35 Claims, 15 Drawing Sheets

Fig. 15
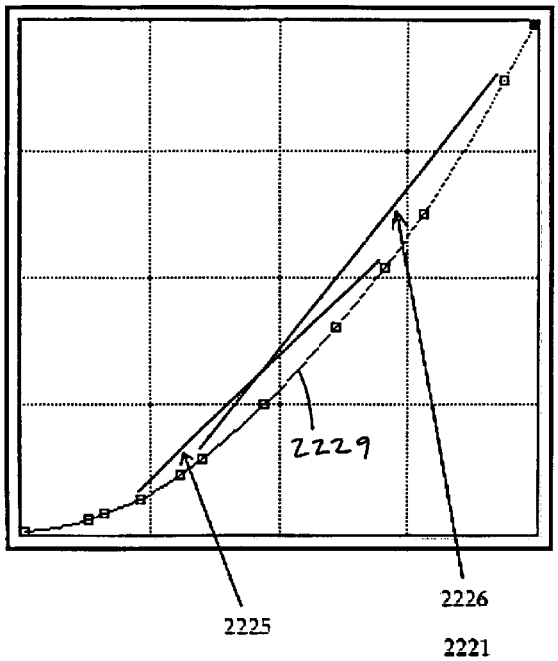
Fig. 16
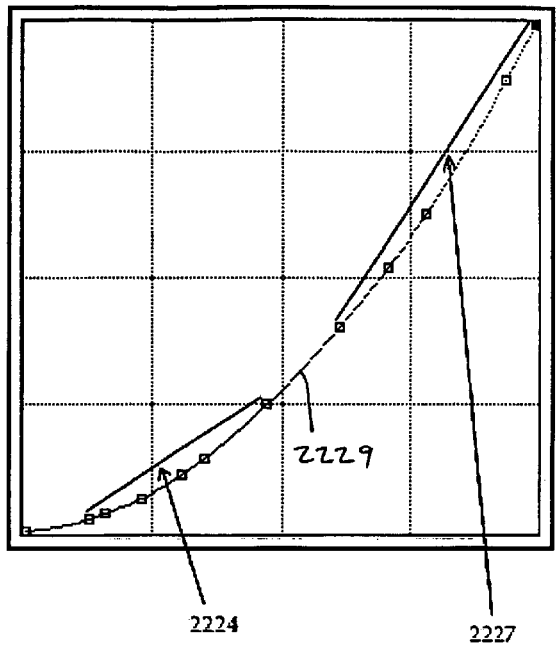
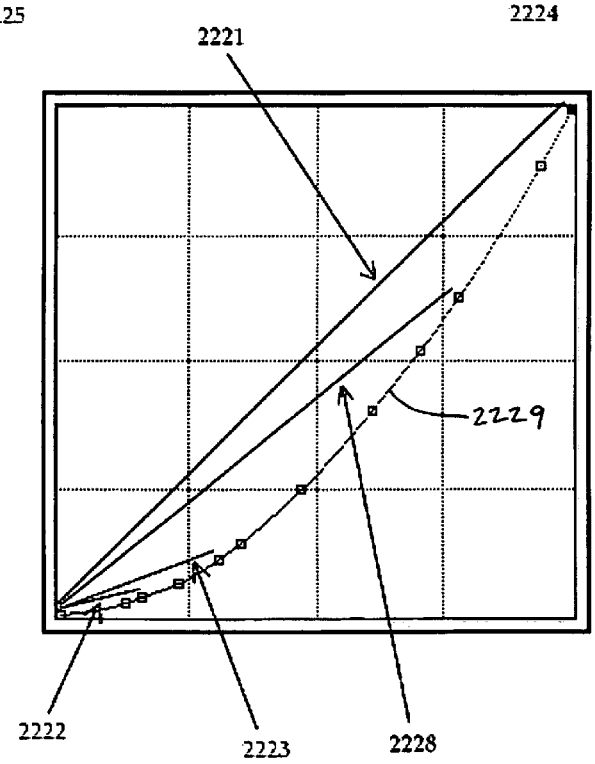
Fig. 17

2285

2285

2284

VISUAL CALIBRATION TARGET SET METHOD

Matter enclosed in heavy brackets [ ] appears in the original patent but forms no part of this reissue specification; matter printed in italics indicates the additions made by reissue.

CROSS REFERENCE TO RELATED APPLICATIONS

This application claims the benefit of U.S. Provisional Application No. 60/185,969, filed Mar. 1, 2000.

FEDERALLY SPONSORED RESEARCH OR DEVELOPMENT

Not applicable.

CD-R APPENDIX

This application includes a one-disk CD-R Appendix, the full contents of which are incorporated by reference herein. The disk contains the following files, listed by file name, creation date and file size in bytes: "ColorBlind Video Startup" created Jun. 22, 1999, 100K; "ColorBlind_Video_Startup.exe" created Sep. 16, 1999, 160K; "Complete_Text.txt" created Feb. 22, 2001, 40K; "Contents_of_CD.txt" created Feb. 22, 2001, 4K; "Lab Color Space Profile" created Aug. 4, 1997, 7K; "Prove it!" created Aug. 27, 1999, 4,116K; "Prove it! Installer" created Jul. 20, 1999, 2,251K; "Prove it_Beta.exe" created Jul. 16, 1999, 11,555K; and "Prove_it_Setup.exe" created Nov. 18, 1999, 7,432K.

FIELD OF THE INVENTION

This invention relates to the calibration of computer monitor displays, more particularly to a method of monitor calibration using target set screen displays and no supplemental light-measuring instrument.

BACKGROUND OF THE INVENTION

Introduction

The invention makes possible a new and superior method for calibrating visual display devices. When using computer systems to view, control and/or print graphics or photographs, it is often critically important that the computer displays be calibrated to a chosen standard condition.

Once a display (also called a "monitor," particularly when referring to computer displays) is calibrated to a known state, techniques can then be employed to cause the display to accurately simulate the appearance of an image or graphic as it appears on, or when printed from, or as seen by another digital imaging device. Absent correct calibration, such simulations become inaccurate in like degree. The capability for accurate simulation is of tremendous importance to digital imaging in general. Therefore, display calibration is an important issue for many people.

The current invention can also be applied to the calibration of television set displays and all other types of analog or digital displays having many levels of intensity in each color channel—typically three channels, one each for red, green and blue.

The current invention is embodied in commercially available software for display calibration called ColorBlind Prove it! from ITEC Color Solutions, San Diego, Calif. The software exists in both Macintosh and Windows versions.

About the Prior Art for Visual Calibration

The prior art makes visual (instrumentless) calibration possible, but in no case does it teach a complete method for obtaining high-quality calibration. The prior art furthermore fails to address a variety of significant problems inherent in display calibration.

The Knoll Gamma version 2.0 application (see FIG. 2), published by Adobe Systems Incorporated of San Jose, Calif., provides an incomplete system, which is capable of visual calibration of low to moderate quality.

U.S. Pat. No. 5,298,993 by Albert Edgar and James Kasson teaches certain useful principles of visual calibration, including the use of targets.

U.S. Pat. No. 5,638,117 by Peter Engledrum and William Hilliard uses areas of parallel lines in a visual characterization process.

The Default Calibrator application from Apple Computer, Inc. of Cupertino, Calif, (see FIG. 3), which is a part of the program entitled ColorSync 2.5 and later, teaches a crude method for display calibration. This is prior art for only that part of the present invention called Gray Balance Method One (see FIG. 11, "Gray Balance Method One Target"). The three lined blended-region-and-solid sub-targets of FIG. 3 are red, green and blue, from left to right.

The image file "Gamma_Estimation" (see FIG. 4), from Candela, Ltd. (now Pictographics International Corporation) of Burnsville, Minn., teaches a method of identifying the current overall gamma from a broad range of possible overall gammas with the use of a gradient.

The image file "Current Gamma" (see FIG. 5), published by Adobe Systems Incorporated of San Jose, Calif., in the program entitled PageMaker 6.5, teaches another method to identify the current overall gamma from a broad range of possible overall gammas.

The image file "Gamma 1.8.tif" (see FIG. 6), also included with Adobe PageMaker version 6.5 software, from Adobe Systems Incorporated of San Jose, Calif., together with Knoll Gamma 2.0.1 and an explanatory text file entitled "Gamma Read Me," teaches an improvement in the accuracy of the verification of a fixed gamma. However, "Gamma 1.8.tif" has significant limitations with regard to its ability to reliably reveal the correct gamma within each of several distinct subsegments of the tone scale because of the way in which tones were chosen to construct the target and the limited number of sub-targets used. "Gamma 1.8.tif" looks at six regions of the tone scale which all overlap a great deal and therefore can obscure the true nature of any observed departure from the gamma curve being sought, thus hindering efficient adjustment to achieve ideal gamma 1.8 tonality. Like all visual gamma adjustment targets, "Gamma 1.8.tif" also cannot be used to verify conformity of any display to other gamma curves, such as 2.2. The target of FIG. 6 comprises various lined blended-region-and-solid sub-targets each having a repeating pattern comprising the alternation of a single lighter row with a single darker row (each row being the same height) juxtaposed with a gray solid region of a value between the lighter and darker values.

The Basic Elements of the Calibration Process

The standard condition to which a display is calibrated is defined partially by the inherent colors, or chromaticities, of the display's purest red, green and blue colors. In the case of a common CRT (cathode ray tube) type display, these colors of red, green and blue are determined primarily by the colors, or chromaticities, of the phosphors used in the tube.

In the case of a flat panel display (FPD), these colors are determined by the mechanism of the display which created the primary colors, which is always different from that of CRTs.

The three other principal aspects of display calibration are not fixed by the nature of the hardware itself (that is, the display or monitor). These three other aspects of display calibration are:

1) Calibrating the white point, i.e. the color of the display's white (independent of its brightness), also known as its Hue and Chroma, also known as its x,y coordinates from the X+Y+Z=1 plane of the CIE XYZ color space;

2) Calibrating its gray balance so that each gray that it displays—from black (the darkest color the display can display in a given state of calibration) all the way to white (the brightest color the display can display in a given state of calibration)—has the same color as the white (also known as the same Hue and Chroma, also known as the same x,y coordinates); and 3) Calibrating the "gamma" or tone curve of the display so that the way it displays the full range of input values from black to white follows the desired progression of luminous intensities. Typically, the full range of digital input values sent from the computer's video circuitry to the display is the range from RGB (0, 0, 0) to RGB (255, 255, 255) where each color channel has a range of 256 (two to the eighth power) values. Gamma curves are a subset of all possible tone curves and have certain mathematical properties. Displays generally need to be calibrated to a gamma curve to function properly as a calibrated display in a color managed system of imaging devices.

Two other aspects of display calibration are:

1) Calibration of absolute white intensity; and

2) Calibration of absolute black intensity.

In addition to the aspects of display calibration mentioned above, there are particular adjustments of so-called hardware controls, such as the Brightness, Contrast, Color, Bias, and Gain controls on CRT displays, which adjustments affect and/or are part of the processes of calibration mentioned above. The affected processes include calibration of the white point, the gray balance, the gamma, the absolute while intensity, and the absolute black intensity.

Flat panel displays (FPDs) exhibit different natural tone curves and white points from CRTs, and typically have different kinds of hardware controls, which affect the appearance of data displayed by these displays. FPDs also require calibration, for essentially the same reasons that CRT displays do.

The Prior Art of Display Calibration, In General

Display calibration techniques in the prior art can be broken down into two main categories of calibration.

One such category is instrumented calibration, where many steps in the whole process of calibrating a display are carried out by attaching a photometer, colorimeter or spectrophotometer to the surface of the display. The attendant display calibration software causes a variety of colors to be displayed by the display. Color measurement readings are taken by the colorimeter (or other instrument), and the software utilizes these readings to facilitate most or all aspects of the calibration process.

The other main category of display calibration is visual calibration, which is accomplished without a photometer, colorimeter, spectrophotometer, or spectroradiometer for the measurement of the display and instead relies on a variety of techniques, methods and processes to accomplish essentially the same things as the instrumented calibration processes. Central to the visual calibration processes are visual targets which provide visual feedback regarding the state of the display, which then allow the user to make informed adjustments to the display using both the built-in display controls and visual calibration software. The visual calibration software modifies the video card LookUp Tables (LUTs) in response to user adjustments of sliders and like on-screen software controls. The software may also perform a variety of related functions such as automated sequential presentation of the visual calibration targets and their attendant tool interfaces, presentation of user instructions, and user education in relevant matters.

Each type of calibration, instrumented and visual, can be implemented with widely varying degrees of success, and the visual methods are potentially and generally more economical due to the lack of the need for a light measuring instrument. The present application concerns itself primarily with visual calibration and not with instrumented calibration.

Both types of calibration can be accomplished with a myriad of variations in the exact details of implementation and methods, but the prior art in visual calibration is inadequate in several key respects, which frequently makes it inadequate for high-quality work. This is due to limitations on its ability to detect and to overcome inherent problems with the nature of the display hardware's behavior and also due to limitations in the ability of the user to have confidence in the accuracy of a calibrated state achieved by prior art visual calibration methods. These problems are solved by the present invention. To a significant degree, the same problem of user uncertainty about the accuracy achieved by instrumented calibration methods also exists and is solved by the present invention.

SUMMARY OF THE INVENTION

The present invention relates to a novel process of visual calibration of computer displays. The current invention addresses all of the significant shortcomings of the prior art and, for the first time, provides a method for complete, high quality calibration of displays, particularly all computer displays. It successfully addresses each of the five specific problems in the prior art.

First, the current invention provides an objective visual method for determining the precisely optimal brightness setting for CRT displays, which method is also applicable to the setting of the "Black Level" control on some FPDs. Accurate brightness or black level setting or its equivalent tone control in the video card LUTs is a requirement for achieving any of the necessary standard tone curves. Prior art solutions to setting the brightness gave vague and subjective assessments of the shadow tonalities, which derive from the range of possible brightness settings. By finding a certain tonal relationship between two adjacent or slightly overlapping tone regions close to black, the desired curve shape can be found, by user adjustment of the brightness control while looking at the target, which is appropriate to the level of flare in their system. The system includes at least the hardware, the video LUTs and the viewing environment.

Second, the current invention provides a precise method to visually determine conformity of a display's tonality to a given standard tone curve, for example a gamma 1.8 curve, which is embodied in one of the preferred calibration target sets of the invention. The current invention clearly reveals conformity with the standard tone curve for each relevant sub-region of the tone scale, thus assuring a visual tone match between the displayed image and the image data when simulations are performed (see FIGS. 13–17). The prior art methods provide only limited ability to verify the actual tonality of a display and its conformity to a standard tone curve, because the methods of the prior art do not reveal the tonality of each relevant subsection of the tone curve. Also, some prior art methods rely on a gridded or halftone pattern of mixed dark and light tones instead of a pattern of alternating horizontal lines, rendering them essentially useless for reliable tone calibration of CRT displays because of limitations of the electronics of CRT displays. The present invention relies primarily on patterns of mixed light and dark tones, which consist of horizontal lines containing only one value, for gamma or tonality assessment. The invention relies primarily on such lined patterns, which complement the nature of currently ubiquitous display hardware used for imaging. The invention also makes it feasible to implement a solution which, in the visual calibration targets, includes the mixing of pixels of different values in individual, horizontal rows of pixels, especially in the Gray Balance Method Two procedure and target. Flat panel displays, which are not in widespread use for imaging, are likely to be much better suited to use with such mixed pixel values in individual horizontal rows of pixels in the visual calibration targets than are CRT displays of the present day. The invention also makes it possible to combine the gamma and gray balance adjustment functions into a single target set which relies on a combination of patterns such as described below in the Gray Balance Method Two targets (see FIGS. 9 and 23).

Third, the current invention is unique in meeting the need to sense and therefore be able to control and to verify the correct gray balance of the entire tone scale of the display. A process of visual comparison of the color (Chroma and Hue, or x,y coordinates) of each major region of the tone scale to that of the white is provided. The prior art at best only facilitated visual assessment of the gray balance of a portion of the tone scale. Side-by-side comparison of most of the colors in question is used, with each seen at the same lightness, instead of highly disparate lightnesses. Most importantly, a pattern of alternating tones arranged in lines is used which extends the ability to view adjacent, same-lightness gray regions not only to the midtones or upper midtones, but to the three-quartertone and quartertone regions of the tone scale as well. A second preferred embodiment extends this reach to a darker value still, essentially covering the entire tone scale. The three-quartertone, midtone and quartertone regions are not merely the regions of 25%, 50% and 75% luminance, rather, they are the more widely spaced regions of roughly 25%, 50% and 75% of the zero to 255 RGB input values scale of a display calibrated to a common gamma standard, such as 1.8 or 2.2 (see FIG. 9, illustrating what is referred to herein as Gray Balance Method Two, the first of two preferred embodiments of this part of the invention). In each of two preferred embodiments shown, a gray scale is added to the three or four lined-versus-solid sub-targets to augment the ability to sense and correct gray balance errors near black and to verify the approximate gray balance of the entire tone scale. In the case of a display calibrated to a gamma of 2.2, the absolute luminosity of the midtone is roughly 25% to 30% of that of the white and the absolute luminosity of the three-quartertone is roughly 6% of that of the white.

The second preferred embodiment of the gray balance capability of the invention (see FIGS. 23, 24 and 25, illustrating what is referred to herein as Gray Balance Method Two, Increased Precision) extends the ability to see even further into the shadows by utilizing a pattern of dots, at the risk of making this embodiment function less ideally with CRT displays, in terms of correct lightness in the blended areas. This embodiment allows double the gray balance matching precision in the three-quartertones, relative to the first embodiment, and brings precise-matching to an even darker value of RGB (40, 40, 40) in this target example designed for use at gamma 2.2. This is more than 5/6ths of the way from white to black in the input value scale, and is a tone which, in this case of a gamma 2.2 version of the target, equals only 2% of the absolute luminosity of the white. This second preferred embodiment also increases the precision of the quartertone matching when used with displays having color crossovers in the lighter half of the tone scale. Flat panel displays are more prone to this problem than are CRT displays. Numerous variations on this part of the invention are possible, as necessitated by the nature of the display, the nature of the software interface, or the need for simplicity in the method. For example, more sub-targets can be added at almost any lightness where user control is needed to force correct tonality or gray balance. Also, a single target set of a type broadly similar to the Gray Balance Method Two, Increased Precision target (see FIGS. 23, 24 and 25) can be used for both gamma and gray balance adjustment. By combining tones in new and more complex patterns than the prior art, the invention makes it possible to extend gray balance from the white to a midtone value, and from there to other values, and so on, until all important parts of the tone scale have been reached with the ability to match them to the color of the white.

The same extension of the user's ability to see into the three-quartertones and quartertones provided by the current invention as seen in FIG. 9, is found in the secondary gray balance method of the current invention (see FIG. 11, illustrating what is referred to herein as Gray Balance Method One). In this case the user is taught to rely on matching lightness instead of matching Chroma and Hue, because the target splits the image into its separate red, green and blue channels (see sub-target rows 2101, 2102 and 2103 of FIG. 11).

Fourth, to solve the problem of verifying the similarity of the tone curve in the display profile and that of the actual calibration, a new method is presented in the current invention. By converting a preferred RGB gamma target, such as that discussed above and shown in FIG. 13, into CIE Lab image data through an ideal display profile of the correct gamma, a new kind of target is created. This Lab gamma target has an identical appearance to that of the original RGB gamma target if and only if the transformation through a selected display profile from Lab back to RGB is the precise reverse of the original transformation. Deviations in the appearance of the RGB and Lab gamma targets, seen with the aid of soft-ware created to implement the targets and methods of the present invention, reveal any mismatch between the profile and the calibration that affects the gray-scale of an image.

Fifth, the above features of the current invention make the use of a visual calibration method based on most or all of the above features a practical, realistic, economical, and highly effective solution to high-quality display calibration. Even the sum of all prior art does not teach a complete solution to high-quality visual display calibration, and so visual calibration has always been relegated to a strictly second-class role. Now visual calibration can be of such high quality as to be the best method to verify instrumented calibration success or failure under most circumstances.

To complete the process of making a display ready for imaging work, a profile must be made or obtained which complements the calibration. When instrumented display calibration is performed, it is typical of software used for this purpose to also make a profile from information about the display obtained by measurement. For the visual approach to work well, the remaining information which describes the correct absolute color of the display white and the display's pure red, green and blue must be obtained. Fortunately, all four of these numerical values can readily be obtained with sufficient precision to complete the process of readying a display for performing high-quality simulations and color matching, without the necessity of user measurement of the display.

Other novel features which are characteristic of the invention, as to organization and method of operation, together with further objects and advantages thereof will be better understood from the following description considered in connection with the accompanying drawing, in which preferred embodiments of the invention are illustrated by way of example. It is to be expressly understood, however, that the drawing is for illustration and description only and is not intended as a definition of the limits of the invention. The various features of novelty that characterize the invention are pointed out with particularity in the claims annexed to and forming part of this disclosure. The invention resides not in any one of these features taken alone, but rather in the particular combination of all of its structures for the functions specified.

There thus has been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWINGS

FIGS. 15, 16 and 17 together show the eight sections of a gamma 1.8 tone curve which correspond to the sub-targets of the Gamma target of the present invention shown in FIG. 13, each curve sub-section corresponding to one of the eight sub-targets in FIG. 13;

DRAWING REFERENCE NUMERALS

2000 Gray Balance Method Two target
2001 midtone color row
2002 double rows of black pixels
2003 three-quartertone gray solid
2004 three-quartertone sub-target
2005 blended region
2006 gray scale
2007 dark gray solid
2010 adjustment tool
2011 color balance tool
2012 overall button
2013 darks button
2014 lights button
2015 white cross
2021 single row of white pixels
2022 double row of black pixels
2023 midtone gray solid
2024 midtone sub-target
2025 blended region
2041 single row of white pixels
2042 single row of bright gray pixels
2043 single row of black pixels
2044 quartertone gray solid
2045 quartertone sub-target
2046 blended region
2097 three-quartertone red sub-target
2098 three-quartertone green sub-target
2099 three-quartertone blue sub-target
2100 Gray Balance Method One target
2101 bright red sub-targets row
2102 bright green sub-targets row
2103 bright blue sub-targets row
2104 midtone red sub-target
2105 midtone green sub-target
2106 midtone blue sub-target
2107 quartertone red sub-target
2108 quartertone green sub-target
2109 quartertone blue sub-target
2111 three-quartertone column
2112 midtone column
2113 quartertone column
2116 red solid
2117 red line
2118 black line
2200 Gamma target
2201 sub-target
2202 sub-target
2203 sub-target
2204 sub-target
2205 sub-target
2206 sub-target
2207 sub-target
2208 sub-target
2209 lined region
2210 solid
2212 adjustment tool
2213 overall slider
2214 darks slider
2215 lights slider
2221 segment
2222 segment
2223 segment
2224 segment
2225 segment
2226 segment
2227 segment
2228 segment
2229 tone curve
2260 Gamma 1.8 Brightness and Contrast target
2261 office lighting brightness sub-target
2262 contrast sub-target
2263 subdued lighting brightness sub-target
2264 tone solid
2265 tone solid
2266 tone solid
2267 tone solid
2269 tone solid
2270 tone solid
2271 tone solid
2272 tone solid
2275 Gamma 2.2 Brightness target
2276 tone solid
2277 tone solid
2278 tone solid
2279 tone solid
2280 tone curve
2284 gray balance button
2285 curves tool
2286 gray balance curves
2287 luminosity curve
2288 luminosity button
2300 Gray Balance Method Two, Increased Precision target
2301 five-sixths-tone sub-target
2302 three-quartertone sub-target
2303 midtone sub-target
2304 light tone sub-target
2305 gray scale
2306 blended region
2307 light solid
2308 blended region
2309 midtone solid
2310 blended region
2311 three-quartertone solid
2312 blended region
2313 five-sixths-tone solid

DETAILED DESCRIPTION OF THE INVENTION

Figure 1:
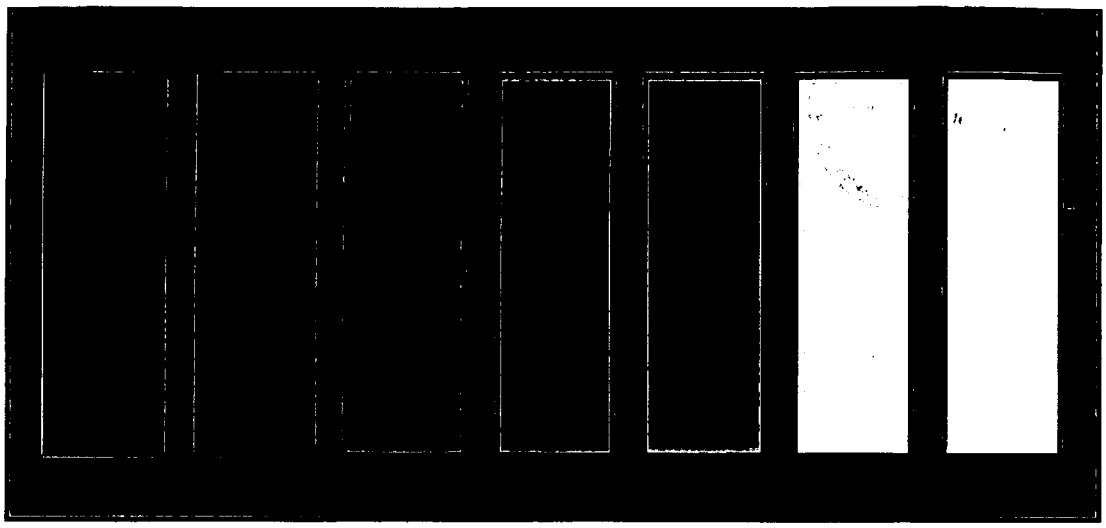
FIG. 1 is a simple gray scale for viewing on screen to detect gray balance errors crudely.
Figure 2:
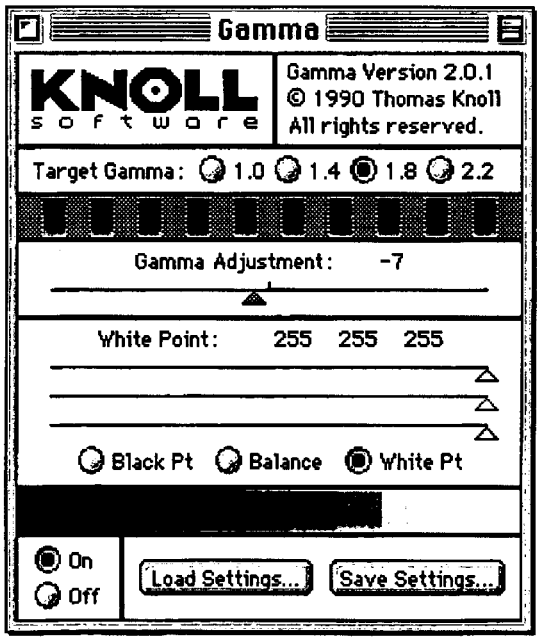
Fig. 2 PRIOR ART
FIG. 2 is the complete prior art Knoll Gamma 2.0.1 software interface.
Figure 3:
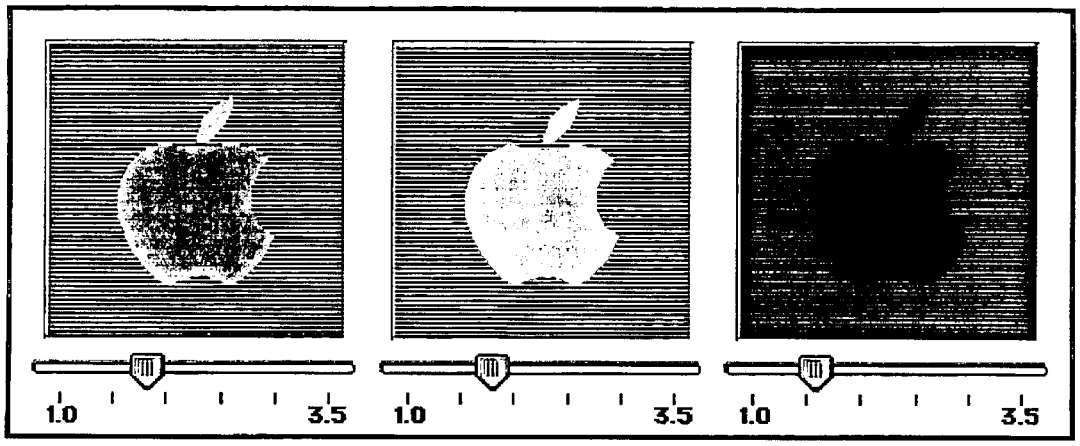
Fig. 3 PRIOR ART
FIG. 3 is the prior art Apple Default Calibrator gamma target.
Figure 4:
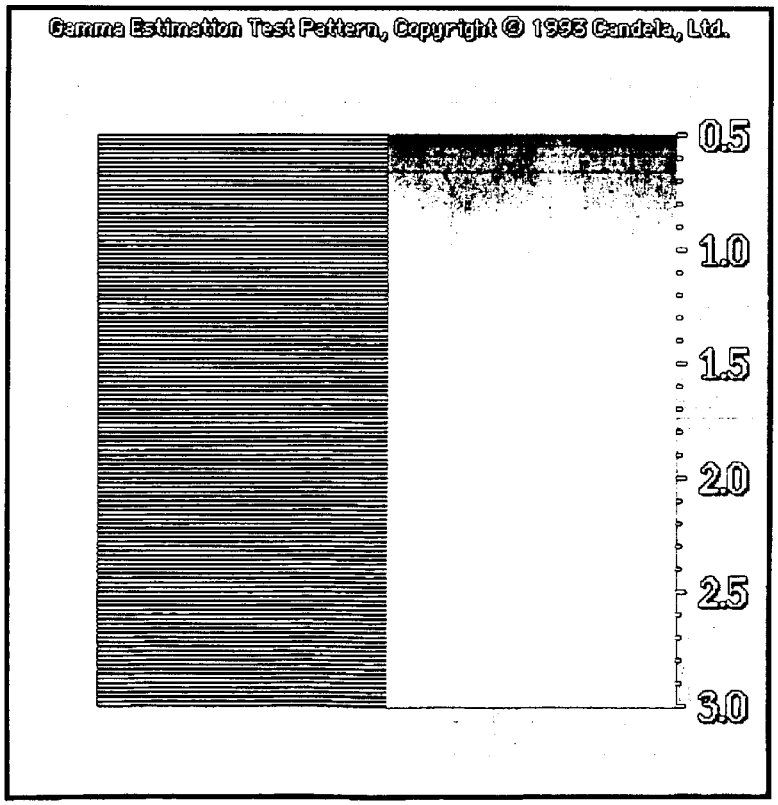
Fig. 4 PRIOR ART
FIG. 4 is the prior art Candela Gamma Estimation target.
Figure 5:
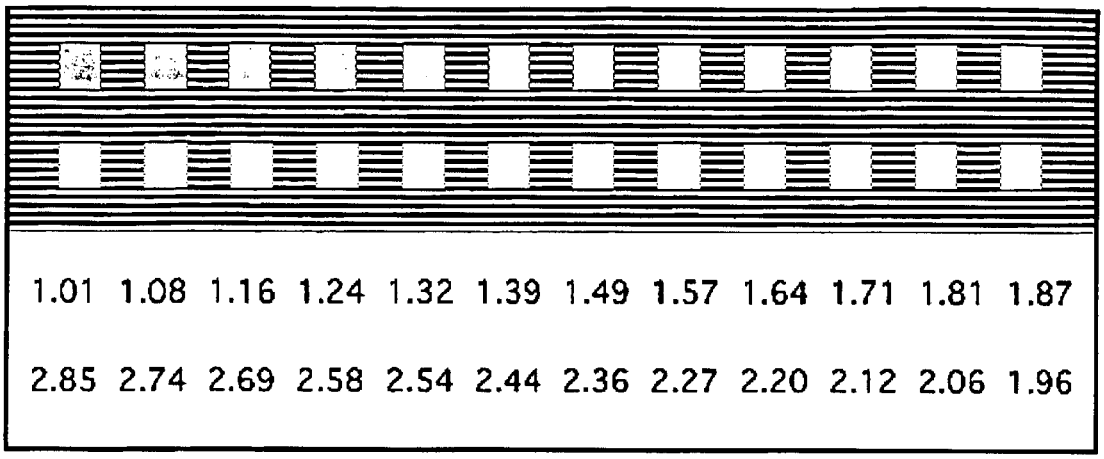
Fig. 5 PRIOR ART
FIG. 5 is the prior art Adobe Current Gamma target.

Gray scales are old and their use well known. One version among many, this one drawn and used by the inventor of the present invention, is shown in FIG. 1. In the context of this invention, it is true that a simple gray scale can provide crude visual feedback for gray balance and tone adjustment. However, the following novel and improved targets and methods comprise a unitary procedure for full calibration of a monitor and like visual displays.

Figure 7:
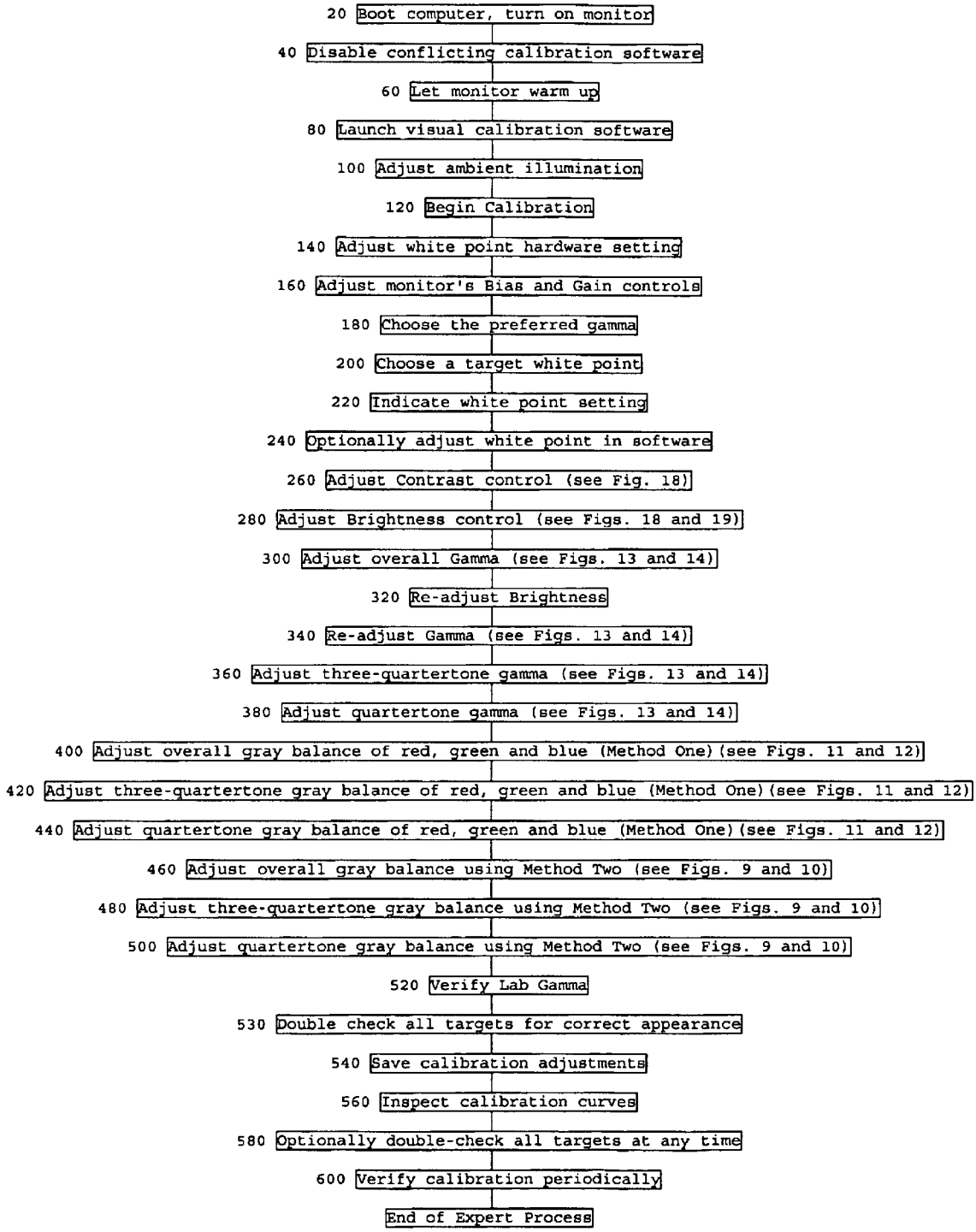
FIG. 7 is a first Flow Chart, showing detailed steps of display calibration according to an embodiment of the current invention.

Referring to the Detailed Flow Chart of FIG. 7, shown therein is a listing of the steps of an expert visual calibration process using the present invention. The Detailed Flow Chart of FIG. 7 will hereinafter be referred to as the Expert Flow Chart. Further reference may be made to the file Complete_Text.txt on the CD-R Appendix mentioned above, which file contains the complete text of the user documentation from both the expert and the easy visual calibration portions of the software ColorBlind Prove it!, mentioned above.

One or more means of obtaining precise display gamma from amongst existing means must be utilized as a standard, from which the calibration thus derived can be "cloned" by making visual calibration targets which appear correctly when viewed on a display with the correct calibration state.

A group of as many as six, and a minimum of three, different kinds of visual calibration targets preferably are used, unless a target is drawn which combines the gray balance and gamma functions, in which case as few as two uncombined targets could be used. The latter possibility is within the scope of the invention, but may not yield the most precise results.

The target designs are digital image data with fixed RGB or grayscale values. When viewed on a perfectly calibrated display, they will exhibit particular tonal values, and in most cases are appropriate for only one desired gamma, such as gamma 1.8 or gamma 2.2. In addition to the targets, visual calibration software offers an appropriate set of tools and a user interface for the adjustment of the display. To calibrate a display, the user makes each of the two to six targets appear correctly when displayed on the display which is being calibrated, by using the targets and the tools provided by the software.

All of the calibration targets should be presented with appropriate surrounding colors on the screen so as to maximize their accuracy and so as to optimize the calibration for those circumstances which best typify the nature of the screen while critical work is being performed. For example, it is usually best to use grays of slightly to moderately subdued lightness around the targets when designing a software interface for use with CRT displays.

The Brightness Target

The Brightness target (FIGS. 18 and 19) is mandatory with CRT displays. This target must contain a set of either three or four dark tones, one of which is usually black, and the others of which are values close to black. Referring to the office lighting brightness sub-target 2261 of the Gamma 1.8 Brightness and Contrast target 2260 of FIG. 18, the tones must be chosen so that during the process of calibration, when the desired brightness is achieved, the visible degree of lightness difference between the tone of the first tone solid 2264 and the tone of the second tone solid 2265 is substantially equal to the visible degree of lightness difference between the tones of second and third tone solids (if only three—not illustrated) or between the tones of the third tone solid 2266 and the fourth tone solid 2267. When properly used, this assures that the nature of the tone curve in the deep shadows is correct at the same time that the overall tone curve is correct. A correct target design must take into account the desired gamma after calibration, the assumed ambient lighting level, and the quality of the anti-reflection coatings of the display. Thus the target is adjusted for both gamma and flare.

Figure 20:
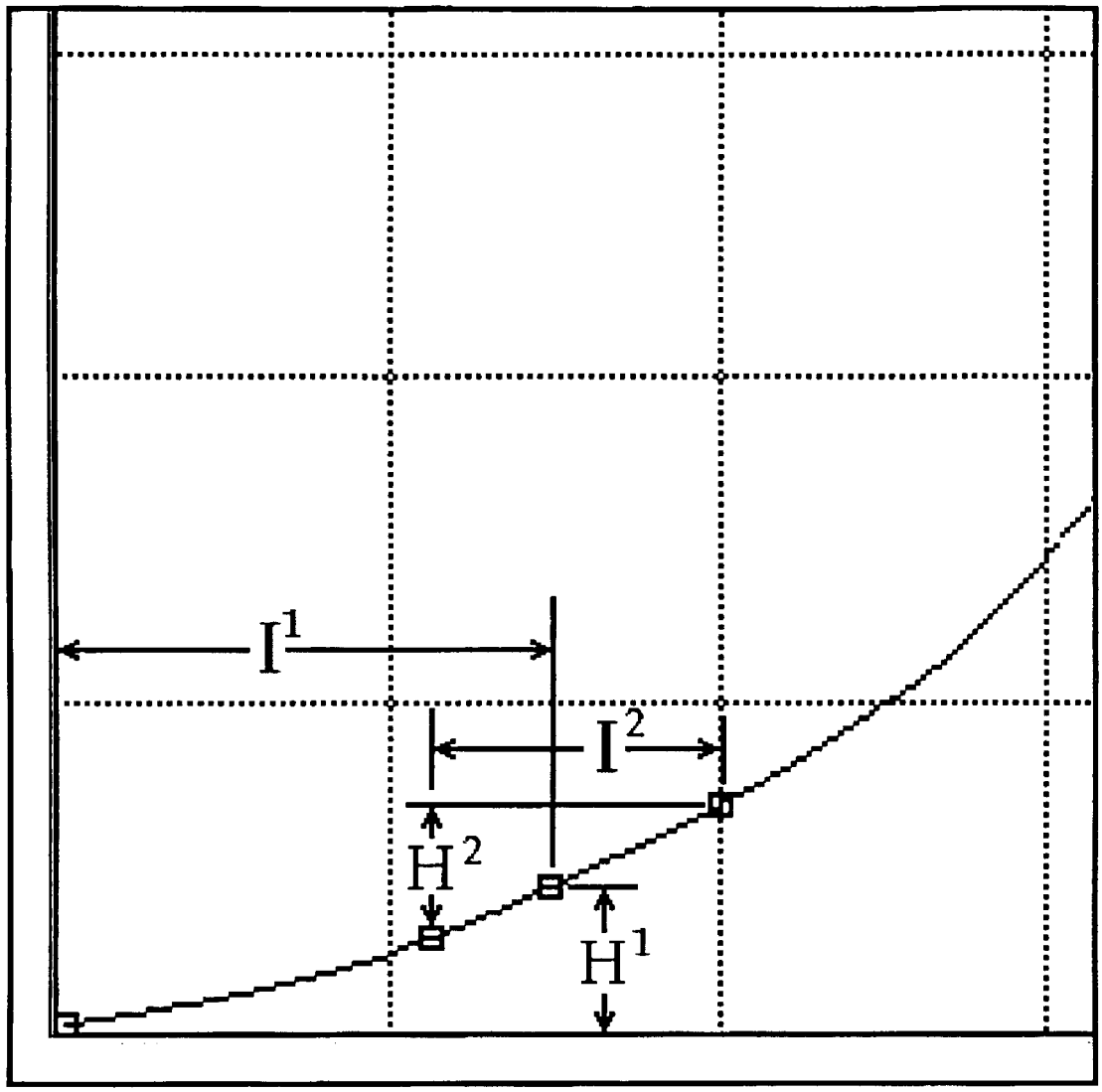
FIG. 20 shows the toe of a display's tone curve and the points in it which correspond to the four points of a Brightness target of the present invention, thus revealing the principle of operation of the brightness targets of the invention.

Referring also to the tone curve 2280 of FIG. 20, this Figure illustrates the relationship of the RGB values used in the target with the apparent lightness of the four dark tone solids 2264, 2265, 2266 and 2267 when the display is correctly calibrated. The first pair of dark gray or black tone solids 2264 and 2265 are separated by an input value difference (RGB value difference) of $I^1$, whereas the second pair of dark gray tone solids 2266 and 2267 are separated by an input value difference of $I^2$. The input value differences are very unequal. The corresponding output lightness differences are $H^1$ and $H^2$, respectively, which are equal.

Figure 18:
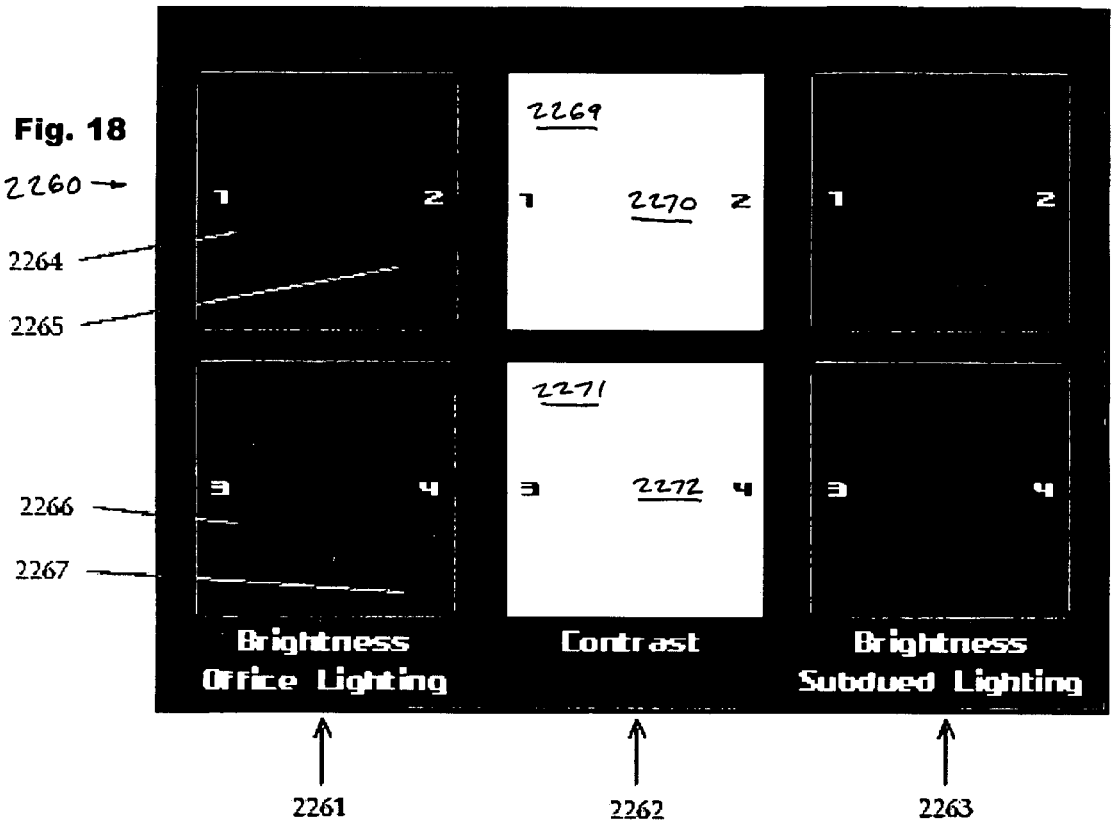
FIG. 18 shows a three-part Brightness and Contrast target for gamma 1.8 of the present invention.

Note that the four dark gray values used in the brightness target or sub-target are not of sequentially increasing RGB value in the sample given. In FIG. 18, the Gamma 1.8 Brightness and Contrast target 2260 consists, in this embodiment, of four values arranged in two square shapes as shown in office lighting brightness sub-target 2261 and four values arranged in two square shapes as shown in subdued lighting brightness sub-target 2263 (i.e., four values in each brightness sub-target, one value per tone solid). The upper square of each brightness sub-target contains two values, and the lower square contains two values. In the example of FIG. 20, the value that corresponds to the lighter (tone solid 2265) of the upper pair of values in the office lighting brightness sub-target 2261 has a value that is higher than the darker (tone solid 2266) of the second pair of values found in the lower square of the office lighting brightness sub-target 2261.

Figure 19:
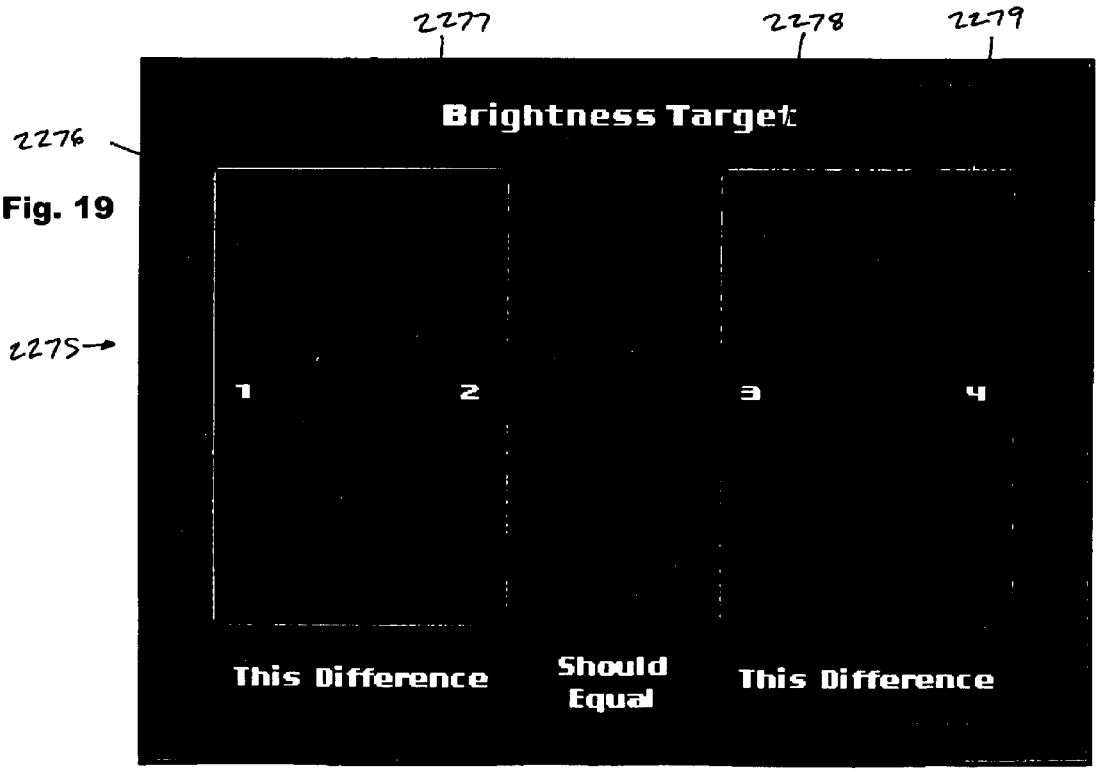
FIG. 19 shows a Brightness target for gamma 2.2 of the present invention.

Three separate preferred embodiments of the brightness target portion of the current invention are shown in FIGS. 18 and 19. FIG. 18 consists of three sub-targets joined together in a single target, namely, Gamma 1.8 Brightness and Contrast target 2260. The left one-third of the figure, vertical sub-target 2261, is a target for adjusting brightness at gamma 1.8 in office lighting of about 200 lux. The center one third of the figure, vertical contrast sub-target 2262, is a target for adjusting contrast over a wide range of gammas, including both 1.8 and 2.2. Although perhaps not completely visible in FIG. 18 as reproduced herein, the shapes labeled "1," "2," "3" and "4" in contrast sub-target 2262 are of the same size and shape as the areas "1," "2," "3" and "4" of sub-targets 2261 and 2263. The right one-third of FIG. 18, subdued lighting brightness sub-target 2263, is a similarly configured target for adjusting brightness at gamma 1.8 in subdued lighting of about 10 lux.

In FIG. 19, one Brightness target for use at gamma 2.2 is shown, namely, Gamma 2.2 Brightness target 2275, which is for working in typical office lighting of about 200 lux. The recommended ambient lighting levels assume typical anti-reflection coatings for the display being calibrated. The Gamma 2.2 Brightness target 2275 comprises tone solid 2276, tone solid 2277, tone solid 2278, and tone solid 2279. Brightness calibration is achieved when the difference in lightness between tone solid 2276 and tone solid 2277 appears to the user to equal the difference in lightness between tone solid 2278 and tone solid 2279.

Each of the three Brightness targets presented in FIGS. 18 and 19 is made from a different sequence of four black and dark gray values to account for the desired gamma and the flare. Each target indicates the correct display tone curve shape in the deep shadows, when the target's appearance is correct under the indicated conditions. Furthermore, a range of possible combinations of values exists for a Brightness target for use in any particular specified condition, which nevertheless all conform to the underlying principle of the invention as illustrated in FIG. 20. This principle is that each of two pairs of adjacent dark gray or black patches in the target shows a lightness difference identical to that of the other pair, when the brightness is set correctly, at the correct overall display tonality or gamma. The two pairs of patches may consist of a total of three patches or a total of four patches. The number of discreet values used in the patches may total either three or four.

The following are two examples of values used in preferred embodiments of the Brightness target of the invention.

The RGB values in the gamma 1.8 target for ambient lighting of about 200 lux, FIG. 18, tone solids 2264, 2265, 2266, and 2267 are (0, 0, 0), (18, 18, 18), (14, 14, 14), and (25, 25, 25), respectively. The corresponding values in FIG. 19 for tone solids 2276, 2277, 2278, and 2279 are (0, 0, 0), (24, 24, 24), (23, 23, 23), and (33, 33, 33), respectively.

The Contrast Target

The Contrast target is not mandatory for CRTs but is recommended. It is mandatory for liquid crystal flat panel displays (LCDs). Such a target is shown in the middle section of FIG. 18, namely, contrast sub-target 2262. This target should merely provide a series of three or four steps of values near white, preferably including white, which serve to reveal tonal separation in the bright end of the tone scale. The target may employ numerical values which are evenly spaced, such as RGB (255, 255, 255), (248, 248, 248), (241, 241, 241), and (234, 234, 234),for solids 2269, 2270, 2271, and 2272, respectively.

Two sources of tonal separation failure in each of CRTs and LCDs are known which this target can reveal. The first is setting the contrast control too high. Most CRT displays do not fail to separate the highlight tones well when set to maximum contrast, but some do. Many if not most LCDs fail to separate the highlight tones correctly when wet to maximum contrast. The second is using 16-bit (or fewer) color display, instead of 24-bit or 32-bit color display, so that only 32 (or fewer) shades of gray can be displayed. The typical number of grays which can be displayed is 256, as when using 24-bit or 32-bit color with a CRT, and this number of grays facilitates precision results with all of the targets of the present invention, which results are otherwise impossible, except by dithering the lesser number of colors to simulate the larger number.

The Gamma Target

The Gamma target, which is mandatory, works only for the chosen gamma, for example gamma 1.8 or 2.2, but not both. Any preferred embodiment of the gamma target of the present invention must represent a full range of different tonal sub-sections of the tone scale of the display. Such a preferred embodiment could include a gray balance target designed to provide adequate control over both gray balance and gamma by virtue of having enough sub-targets and having those sub-targets reveal color and tonality at input values as needed to accomplish good calibration.

Figure 13:
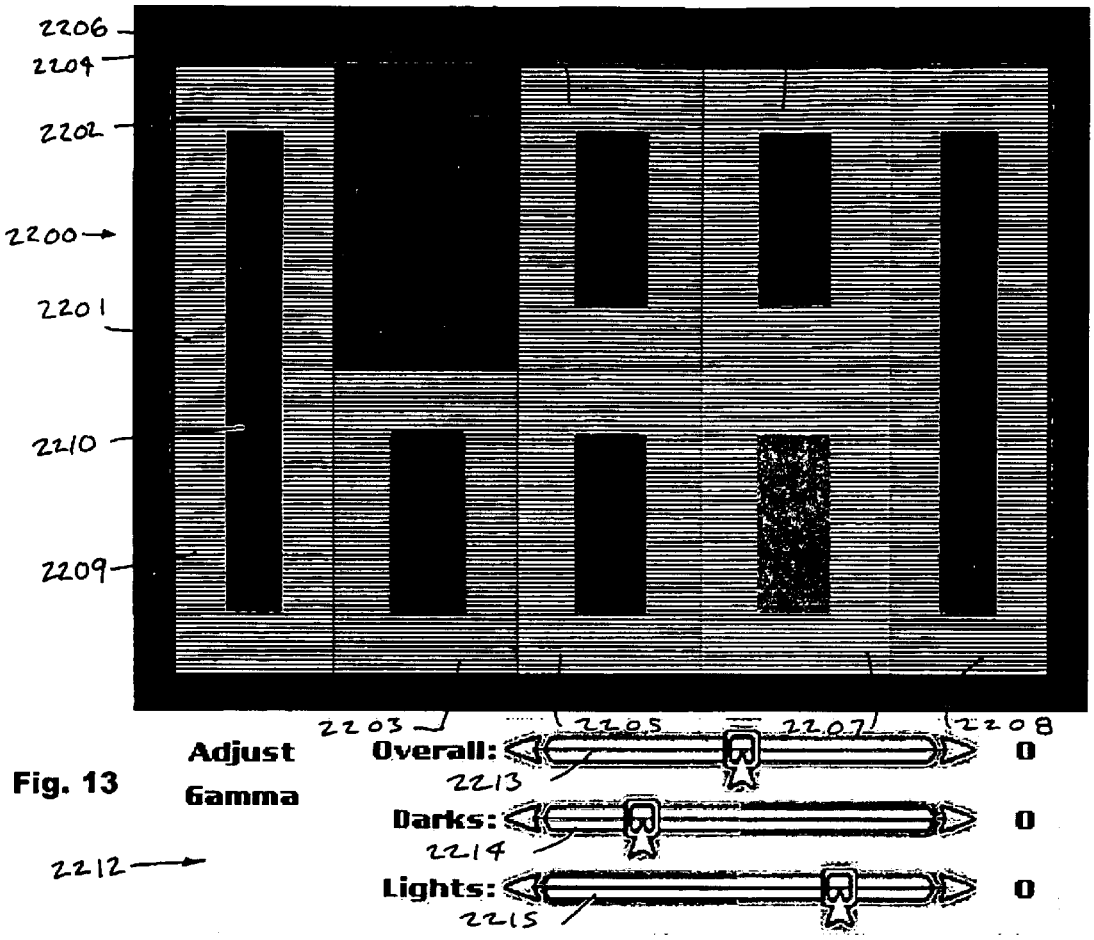
FIGS. 13 and 14 are before and after (approximately simulated in a schematic manner) versions of a preferred embodiment of a Gamma target design of the present invention for use at gamma 1.8, with FIG. 13 including a preferred user interface for making adjustments.
Figure 13B:
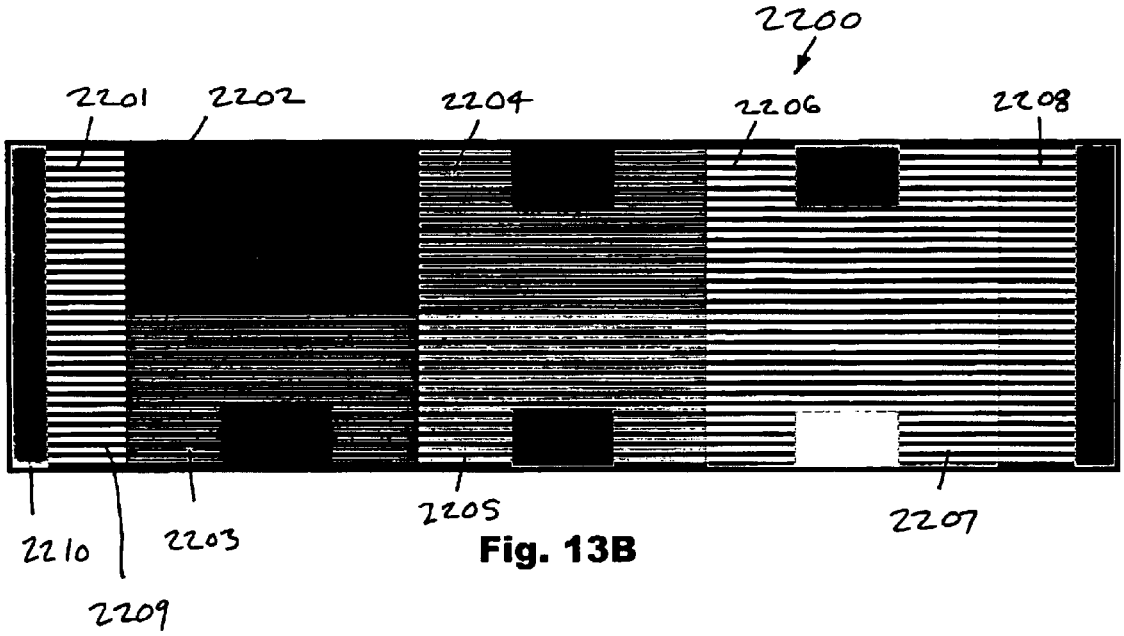
FIG. 13B is an enlarged detail section of the target of FIG. 13.

FIG. 13 illustrates a gamma 1.8 preferred embodiment, namely, Gamma target 2200. Each sub-section of the tone scale is revealed in a separate sub-target of the Gamma target, such as the eight sub-targets of the Gamma target 2200 shown in FIG. 13. The lined regions, for example, lined region 2209 of sub-target 2201 of the target are preferably made from single-pixel horizontal lines for current CRT display technology, but alternatively from lines of more than one pixel vertical height for use with future technologies, such as very high-resolution flat panel displays. Each sub-target of the target must consist of three tones, one dark, one light, and one medium. The dark and light are juxtaposed as alternating lines and the medium is a solid field positioned adjacent to the region of dark and light lines, such as solid 2210 of sub-target 2201. FIG. 13B is an enlarged detail section of the target of FIG. 13.

When the display is correctly calibrated to the target tone curve, the solid field region of the sub-target thus designed must appear to blend by having the same lightness as the adjacent lined region. The hue and chroma of the solid region will appear to be a mismatch in this target if the gray balance is incorrect. Refer to the input values shown in FIGS. 15–17 for a set of values which does a good job of defining a set of optimal sub regions of the tone scale for a gamma target consistent with the present invention. In FIGS. 15–17, the graphs have scales of zero to 255 on the x-axis and on the y-axis, with the values of x and y at the origin (lower left corner) being zero.

Compare the numbered sub-targets in FIG. 13 with the numbered segments of FIGS. 15–17. The numerical sequences of the sub-targets in FIG. 13 are matched to the appropriate curve sections in FIGS. 15, 16 and 17. The first sub-target in FIG. 13 is sub target 2201. The corresponding segment of the tone curve 2229 in FIGS. 15–17, is the segment 2221 in FIG. 17. For sub-target 2202, the corresponding segment is segment 2222 of FIG. 17; for sub-target 2203 it is segment 2223 of FIG. 17; for sub-target 2204 it is segment 2224 of FIG. 16; for sub-target 2205 it is segment 2225 of FIG. 15; for sub-target 2206 it is segment 2226 of FIG. 15; for sub-target 2207 it is segment 2227 of FIG. 16; and for sub-target 2208 it is segment 2228 of FIG. 17.

Figure 6:
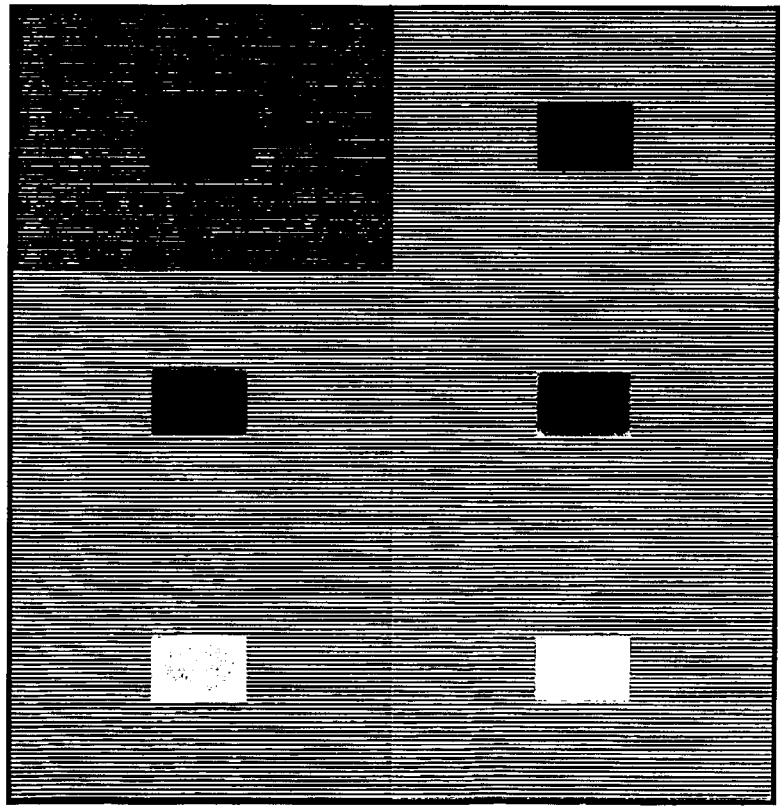
Fig. 6 PRIOR ART
FIG. 6 is the prior art Adobe Gamma 1.8 target.

Inspection of the curve segments thus identified will reveal the way in which this preferred embodiment of the gamma target of the invention separately characterizes each of the many most significant regions of the tone curve of the display. Note that the shadow region of the tone scale of a CRT display is much more likely to exhibit significant departures from the optimal curve shape than other regions, and that the target therefore emphasizes inspection of this region. Unlike the prior art target "Gamma 1.8.tif" (see FIG. 6), many of the sub-targets of this design are unaffected by such incorrect tonality in the deep shadows and thus, taken together, the eight sub targets of this target reveal the overall tonality clearly to facilitate efficient adjustment for correction. When the eight sub-targets of this preferred embodiment of the gamma target of the invention all appear to blend perfectly, as after successful calibration, the display can be known to have essentially perfect tonality.

The Gamma Target User Controls

The software which gives the user control over the display's tonality (as distinct from the on-screen user controls built into the display itself), does so by giving the user control over the LookUp Tables in the video card of the computer. These simple, two-dimensional tables, one for each of red, green and blue, have one output value for each input value. As the user makes gamma adjustments, the tables are altered according to mathematical functions, such as gamma functions or bezier curve functions, which cause the end points of curves representing the tables to remain unchanged, but various sections of the curves to be moved up or down. These adjustments are not gray balance adjustments. Thus, they have the same effect on all three color channels (red, green and blue) and maintain constant gray balance as adjustments are being made. The output values in the LUTs corresponding to inputs of 255 or zero are always unchanged (being 255 or zero, respectively).

Figure 14:
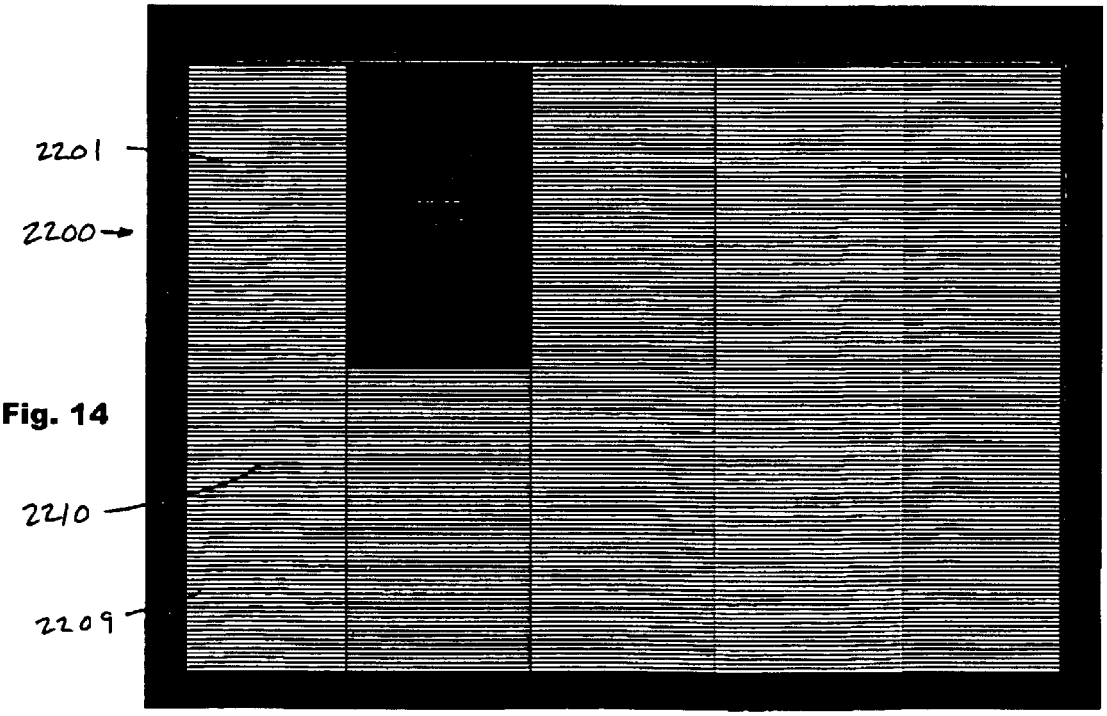

A preferred tool and interface design, namely, adjustment tool 2212 having software sliders of commonly available form, namely, overall slider 2213, darks slider 2214, and lights slider 2215 is shown at the bottom of FIG. 13 (said tool also being present but not drawn in the target of FIG. 14). This adjustment tool 2212 offers control over each of the full tone scale, the bottom half of the tone scale, and the top half of the tone scale. Alternative tools could offer control over a lesser or greater number of separate regions of the tone scale, as appropriate to the skill of the user and the design of the target.

The Gray Balance Method Two Target

Figure 9:
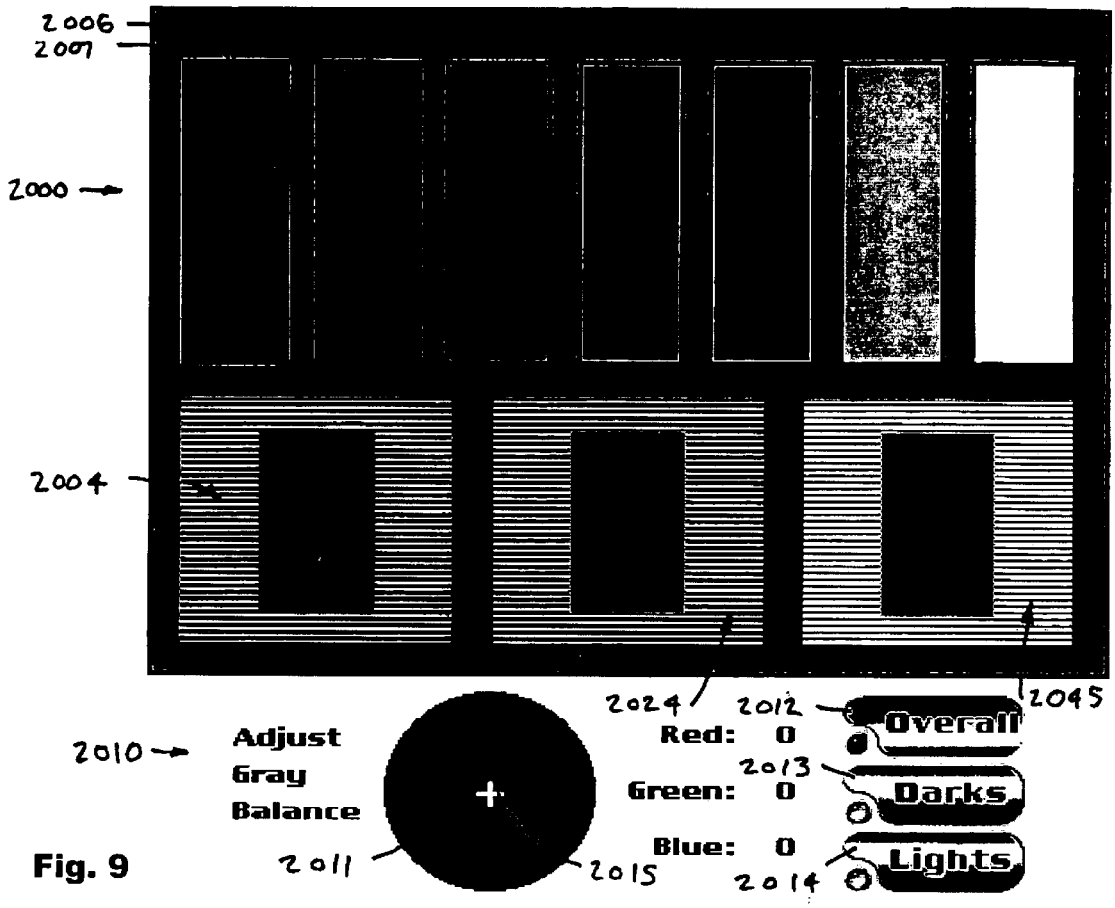
FIG. 9 is a preferred embodiment of one of the two gray balance methods of the present invention, in this example for use at gamma 1.8, called Gray Balance Method Two, including both the Gray Balance Method Two target and, below it, one preferred user interface tool for making adjustments.
Figure 11:
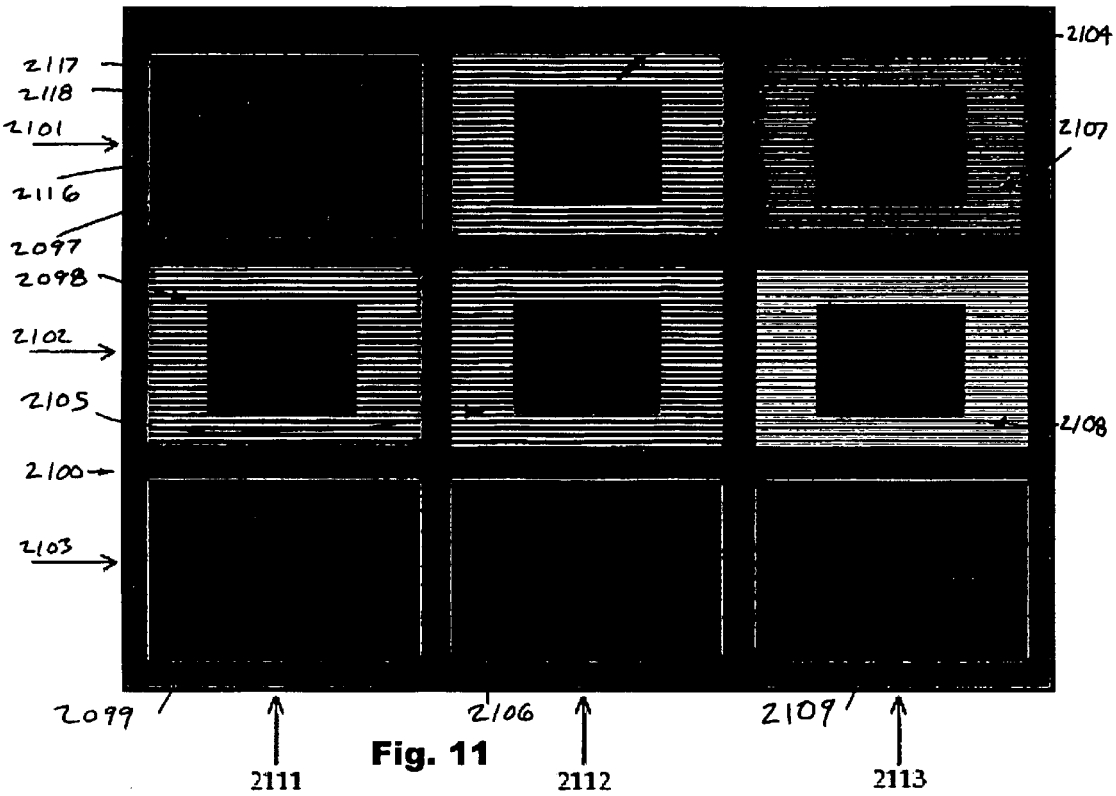
FIG. 11 is a preferred embodiment of the second of the two gray balance methods of the present invention, in this example for use at gamma 1.8, called Gray Balance Method One, showing the Gray Balance Method One target, wherein the upper three sub-targets are red, the middle three are green, and the lower three are blue.

Preferred embodiments of the Gray Balance Method Two target 2000 and Gray Balance Method One target 2100 are shown in FIGS. 9 and FIG. 11, respectively. Each of these targets is optimized for gray scale adjustment but can also be used for gamma adjustment to a degree, when the adjustments provided by the tool in the supporting software allow it. The invention can work in a less than ideal way with only a gray balance target such as shown in FIG. 11 or only one of the kind shown in FIG. 9. However, having at least a target of the kind shown in FIG. 9 probably is necessary for optimal performance of the present invention. Having both kinds of targets is preferred and recommended to accommodate a wide range of human vision and to reinforce the accuracy of the process.

The Gray Balance Method Two target 2000, shown in FIG. 9, uses a new and unique pattern of alternating horizontal lines of pixels in the preferred embodiment shown. In this embodiment, three sub-targets are presented to the user, across the bottom of the target. These are the three-quartertone sub-target 2004 (or similar dark target in the dark region), the midtone sub target 2024 and the quartertone sub-target 2045 (or similar light target in the light region). The three sub-targets allow the user to do the following.

First, the target 2000 contains a means to match the color of the display's white to the midtone color. This is made by creating in midtone sub-target 2024 (FIG. 9B) a blended region 2025 comprising two horizontal rows of black pixels 2022 (the combination being preferably two pixels high) to each one row of white pixels 2021 (preferably one pixel in height), said combined two black rows and single white rows alternating throughout the blended region 2025. A gray color is selected for the center midtone gray solid 2023 that matches the lightness of the blended region of lines at the target gamma, such as gamma 1.8 or 2.2. The gray color of this midtone gray solid 2023 will usually be somewhat higher than a value of RGB (128, 128, 128), as necessitated by the nature of the display and its gamma. In this example, which is a gamma 1.8 target, the midtone value used for the solid 2023 is (139, 139, 139).

Figure 9A:
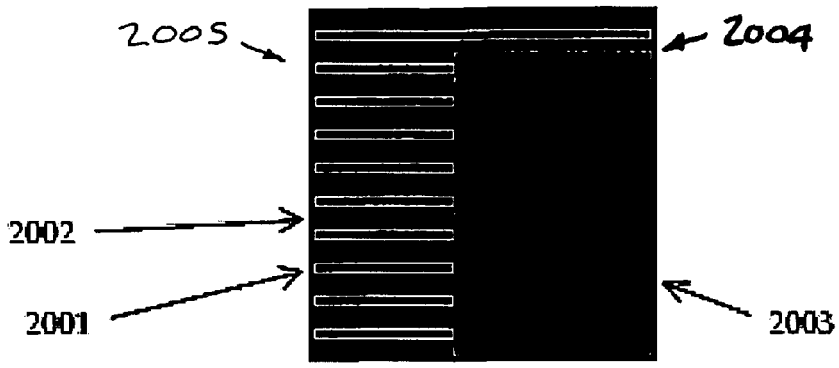
FIG. 9A is an enlarged three-quartertone sub-target detail from the left side of the Gray Balance Method Two target of FIG. 9.
Figure 9B:
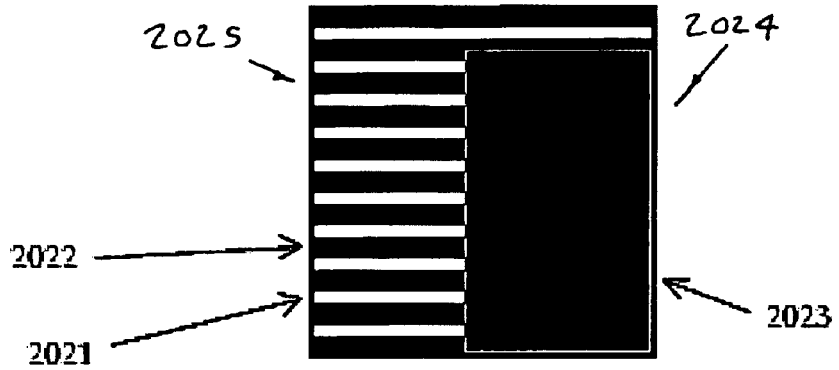
FIG. 9B is an enlarged midtone sub-target detail from the center of the Gray Balance Method Two target of FIG. 9.

In FIG. 9B, one sees a section of the midtone sub-target 2024 enlarged to 400% relative to FIG. 9. Item 2022 is a double row of black pixels, value (0, 0, 0). Item 2021 is a single row of white pixels, value (255, 255, 255), and item 2023 is a midtone gray solid of value (139, 139, 139).

Second, the target 2000 contains a means to match the color of the three-quartertone region (or similar dark region) to that of the midtone. In this preferred embodiment, this is made by creating in three-quartertone sub-target 2004 a blended region 2005 of two rows of black pixels (for a total height of preferably two black pixels) to one row of midtone color (for a preferred height of one midtone pixel) (FIG. 9A). In this example, the midtone color rows 2001 that are mixed with the double rows of black pixels 2002 have the RGB value (118, 118, 118) and the gray solid or field 2003, used as the three-quartertone gray solid, is RGB (63, 63, 63).

Figure 9C:
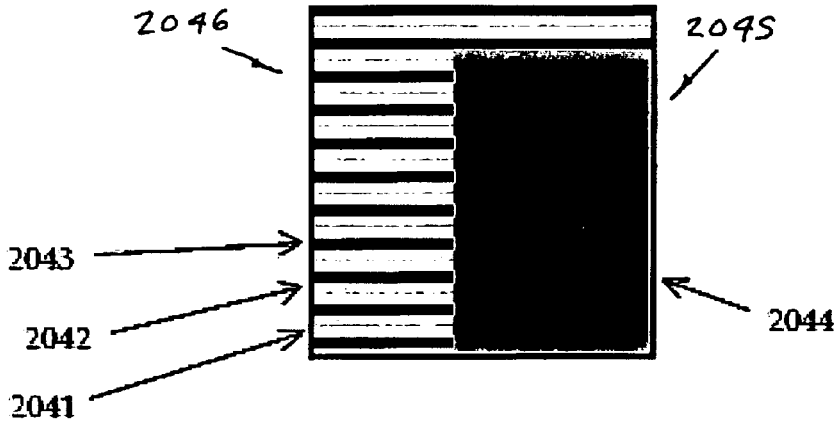
FIG. 9C is an enlarged quartertone sub-target detail from the right side of the Gray Balance Method Two target of FIG. 9.

Third, the target 2000 contains a means to match the color of the quartertone region (or similar light region) to the color of the display's white by creating in quartertone sub target 2045 a blended region 2046 comprising one row of one-pixel-high white, RGB (255, 255, 255), one row of a very bright one-pixel-high gray color such as RGB (225, 225, 225), and one row of one-pixel-high black (0, 0, 0), in an alternating repeating pattern. The very bright gray color cannot be used in this manner with LCDs because of the typically strong gray balance shift that occurs naturally in the bright end of the tone scale of such displays, requiring a different blending of tones for such a light region sub-target. Referring to FIG. 9C, row 2041 is the single row of white pixels, row 2042 is the single row of bright gray pixels, and row 2043 is a single row of black pixels. Field or solid 2044 is the quartertone gray solid surrounded by the blended region 2046.

The basis of the method of operation of the Gray Balance Method Two target 2000 of FIG. 9 is as follows. The blended region 2025 containing alternating one white row of pixels 2021 and two black rows 2022 (found in the midtone sub-target 2024, see FIG. 9B) consists of approximately 99% light coming from the white row and 1% coming from the black rows. This means that the color or hue and chroma of the blended region 2025 derives essentially totally from the color of the display's white. Matching a midtone gray to that color when both appear to have the same lightness makes very precise gray balance adjustment of the midtones possible and easy. A=C, where A is the color of white and C is the color of the midtone. The software control used with this Gray Balance Method Two target can offer adjustment of lightness as well as color, when it is desired that this kind of target provide gamma adjustment capabilities in addition to gray balance adjustment capabilities. The principle of target operation is the same for both capabilities.

The blend of midtone value and black (found in the three-quartertone sub target 2004, see FIG. 9A) gives a blended region 2005, comprised of alternating midtone color rows 2001 and double rows of black pixels 2002, which region similarly derives its hue and chroma almost entirely from that of the midtone. Thus if one matches the hue and chroma of the three-quartertone solid 2003, which is a darker value than a midtone, to that of the blended region 2005, being a blend of said midtone and black, the three-quartertone will then have the same hue and chroma, and/or lightness as the midtone. If A=C and C=D, then A=D, where D is the color of the three-quartertone.

The blend of white, near white (bright gray), and black (found in the quartertone sub-target 2045, see FIG. 9C) creates a blended region 2046 which similarly derives its hue and chroma almost entirely from the white and near white. Thus if one matches the hue and chroma, and/or lightness of a quartertone value, which is a lighter value than a midtone, to that of white or near white, A=B, where B is the color of the quartertone.

When all three sub targets look correct, A=B=C=D and the entire tone scale is very closely gray balanced and/or gamma adjusted, with the remaining possible exception of the black itself and colors very near black, in which colors errors are most difficult to see anyway. Accordingly, gray balance calibration and/or gamma adjustment is accomplished using the Gray Balance Method Two target 2000 when, after manipulation of the adjustment tool 2010 and/or a gamma adjustment tool such as the sliders 2213, 2214 and 2215, the solids 2003, 2023, and 2044 appear to the user to blend in with (disappearing as separate entities) the surrounding blended regions 2005, 2025 and 2046, respectively. When such blending occurs and calibration is achieved, a blended-region-and-solid target is said to appear fully blended visually.

By using an alternating pattern of three rows per cycle for the blended regions of the Method Two Gray Balance target, sufficient smoothness is maintained so as to allow the user to squint and/or move back from the display in order to smoothly perceive the hue and chroma of the blended region. This facilitates comparison with the hue and chroma of the adjacent solid region for careful adjustment of the gray balance and/or gamma of each, major region of the tone scale with the tool interface provided. This avoids the need to use alternating pixel values within a single row of pixels, while maintaining adequate smoothness to support all displays typical of this era, including predominantly CRT monitors. As displays increase in resolution, the tolerance for coarse patterns of alternating lines increases: Also, as flat panel displays begin to be used for imaging work, the limitations imposed by display technology on the preferred target designs of the invention change. It is highly probable that such changes will include a diminution of problems associated with using alternating pixel values in a given horizontal row. Thus other preferred embodiments of the invention may include targets similar to the one shown in FIGS. 9, 9A, 9B, and 9C, but which utilize patterns with alternating pixel values in some horizontal lines to increase the target's power to reveal gray balance and/or tonal errors and which extend that ability into darker regions of the tone scale, for example. Such an alternate preferred embodiment of the invention, referred to as Gray Balance Method Two, Increased Precision, is shown in FIGS. 23, 24 and 25 and is discussed below.

The Gray Balance Method Two target includes (see the top of FIG. 9) a gray scale 2006 with usually six, seven, or eight equally spaced steps, sufficient to result in a dark gray patch 2007 with a value of roughly (42, 42, 42). This dark gray patch 2007 is sufficiently close to black as to reveal significant residual gray balance errors in the black region after calibration using the three sub-targets described above, and yet not so dark as to make visual detection of such errors difficult. The RGB value of this patch of the gray scale 2007 must be chosen to optimize the efficiency of the target for this purpose. The remainder of the gray scale merely provides further verification of the correctness of the overall gray scale, albeit with much less precision than the three sub-targets 2004, 2024 and 2045, which facilitate same-lightness comparisons of hue and chroma. The sub-targets make very precise gray balance adjustments in their respective tone regions possible and easy to perform.

With the inclusion of the gray scale 2006 as described to the Gray Balance Method Two target 2000, a complete solution is provided for attaining perceptually excellent gray balance for the entire tone scale, which is one of the key goals of display calibration.

Figure 23:
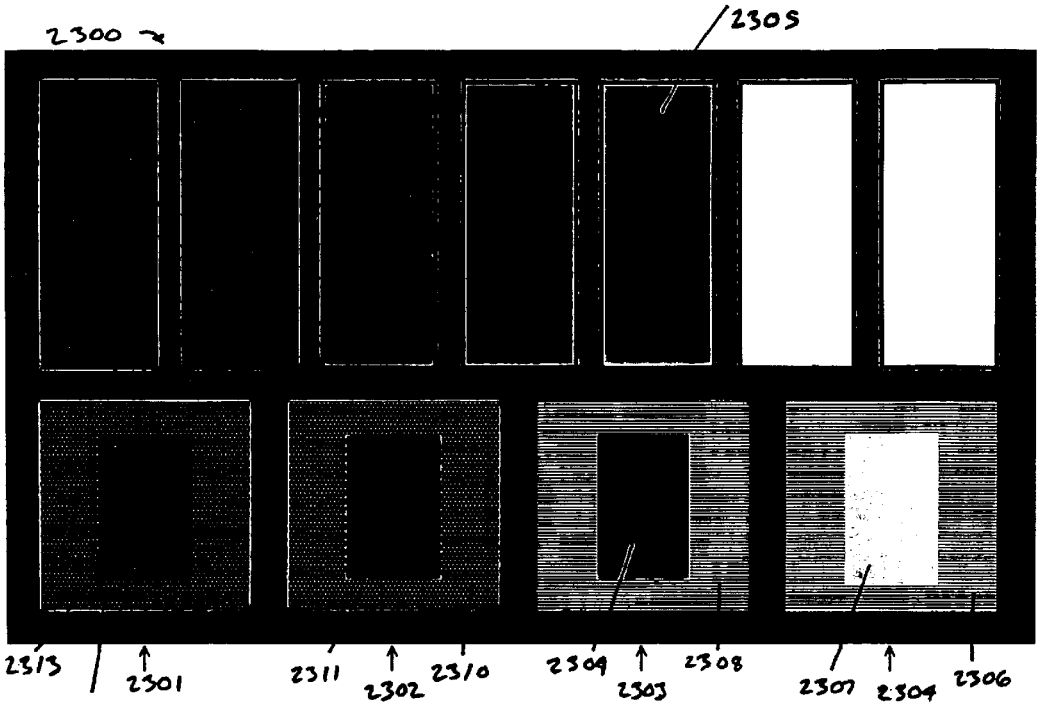
FIG. 23 shows the target for an alternate preferred embodiment of one of the two gray balance methods of the present invention, in this example for use at gamma 2.2, called Gray Balance Method Two, Increased Precision.
Figure 24:
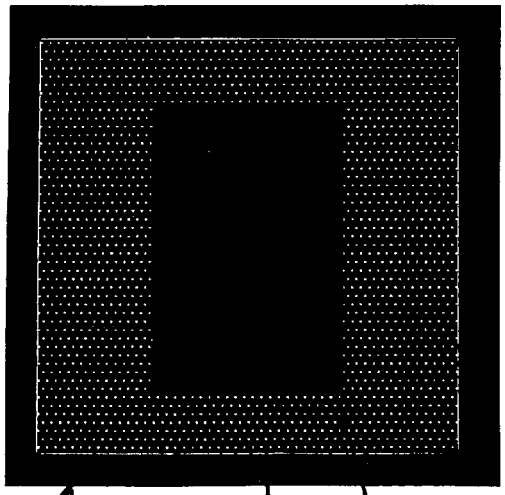
FIG. 24 is the 5/6$^{th}$ tone sub-target from the lower left corner of the Gray Balance Method Two, Increased Precision target of FIG. 23 at 200% relative enlargement to reveal detail.
Figure 25:
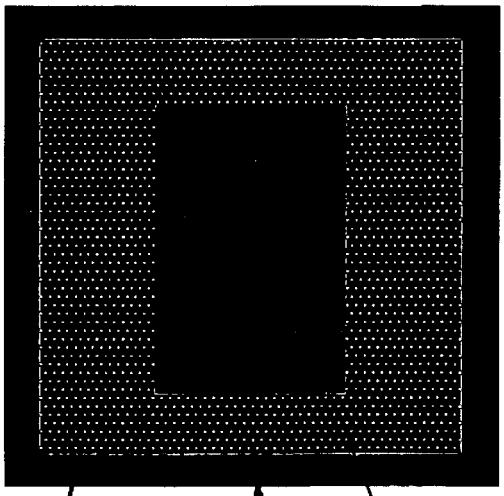
FIG. 25 is the three-quartertone sub-target of the left-center of the Gray Balance Method Two, Increased Precision target of FIG. 23 at 200% relative enlargement to reveal detail.

A second preferred embodiment of the gray balance features of the present invention is referred to as the Gray Balance Method Two, Increased Precision target 2300 (see FIGS. 23, 24 and 25). This target is optimized for displays that do not suffer seriously from an inability to display individual white pixels surrounded in the same horizontal row by black pixels with predictable luminosity, which may be much the same as that luminosity produced when the same white pixel is surrounded by white pixels. Flat panel displays may be inherently more capable of this than are CRTs. This second embodiment is also useful for increased gray balance precision on CRTs, despite their potential inability to display pixels that are unaffected by the surrounding pixels within a given horizontal row of pixels (scan line).

The light or quartertone sub-target 2304 comprises a light or quartertone solid 2307 adjacent to a blended region 2306 having a mixture of midtone pixels and light (preferably white) pixels. Preferably, the two preferred tones of pixels are formed into alternating horizontal lines, as in similar light sub-targets.

The midtone sub-target 2303 comprises a midtone solid 2309 adjacent to a blended region 2308 having a mixture of substantially black pixels and light (preferably white) pixels. Preferably the two tones are formed into alternating horizontal lines, as before.

The dark or three-quartertone sub-target 2302 comprises a dark or three-quartertone solid 2311 adjacent to a blended region 2310 having a mixture of substantially black and white pixels. Preferably the white pixels are grouped into dot-like patterns surrounded by a background of the substantially black pixels.

The very dark or five-sixths-tone sub-target 2301 comprises a very dark or five-sixths-tone solid 2313 adjacent to a blended region 2312 having a mixture of substantially black and midtone pixels. Preferably the midtone pixels are grouped into dot-like patterns surrounded by a background of the substantially black pixels.

By using a pattern of between one and three white pixels per contiguous group of about twelve total pixels, with the rest being black, a uniform pattern is made which blends with sufficient visual smoothness on higher-resolution displays (see the dotted blended region 2310 of the three-quartertone sub-target 2302 of FIG. 25 and FIG. 23). This same pattern of pixels, which may be said to comprise a uniform pattern of small fields of a light tone surrounded by a larger background of a dark tone, yields an apparent brightness at a gamma 2.2 calibration state, which approximately matches that of the three-quartertone value of (65, 65, 65). Because the color of this blend is coming approximately 92% from the few white pixels and approximately 8% from the black pixels, the blended region 2310, when compared with a dark or three-quartertone solid 2311 of a gray solid color of (65, 65, 65) enables direct matching from the white to the three-quartertone, thus doubling the matching precision. A=D directly, instead of A=C=D.

By further modifying the last uniform repeating pattern so as to blend between one and three pixels of the value from the midtone sub-target's gray solid instead of white, which in this case is (155, 155, 155), per contiguous group of about twelve total pixels, with the remainder of the group being black pixels, a fourth sub-target is created which allows indirect gray balance matching of a tone which is considerably darker than the three-quartertone, for example, about five-sixths-tone. In FIGS. 23 and 24, this fourth sub-target is the five-sixths-tone sub-target 2301, comprising a very dark or five-sixths-tone solid 2313 ("very dark" meaning noticeably darker than dark solid 2311) surrounded by a dotted blended region 2312. In the case of the gamma 2.2 version of this target, the RGB value is (40, 40, 40), which has, at gamma 2.2, a luminosity of only 2% that of the white. Thus, A=C (where C is the midtone) and C=E, where E is the $5/6^{th}$ tone, so A=E.

By taking the tendency of flat panel displays to have strong, light tone color crossovers into account while making the quartertone sub-target of a Gray Balance Method Two target of the invention, a different result is obtained, which is shown as the quartertone or light tone sub-target 2304 in FIG. 23. This sub-target is made with a repeating pattern of one row of white pixels plus two rows of midtone pixels (each midtone row being the same height as one white row) forming the blended region 2306 and with a light solid 2307. In other variations of this target, there could be one row of black, one of midtone and one of white, as in FIG. 9.

Once the midtone sub-target 2303 has been used to match the color of its gray midtone solid 2309 to the hue and chroma of the white, the combination of white and midtone colors used in sub-target 2304 then makes it possible to achieve enhanced accuracy for the light quartertone solid 2307 gray balancing. The values chosen for the quartertone sub target 2045 of the first embodiment of the Gray Balance Method Two (FIG. 9) allow the quartertone sub-target 2045 of FIG. 9 to be to make quartertone adjustments prior to accurate adjustment of the midtone sub-target 2024, but these chosen values also assume relative freedom from color crossovers in the light end of the uncalibrated tone scale of the display. This freedom from crossovers is typical of CRTs but less typical of flat panel displays, which usually do suffer considerable color crossovers in the lighter portion of their uncalibrated tone scale.

Note that the Gray Balance Method Two and Gray Balance Method One targets of the present invention can also be used as gamma adjustment targets if the tools provided in the software interface allow it, but they are not as well-suited for this purpose as the preferred Gamma targets of the invention unless the number of sub-targets in them is increased to between five and eight.

The Gray Balance Method Two Target User Controls for the First Preferred Embodiment A preferred software control or interface tool 2010 is shown at the bottom of FIG. 9. The overall button 2012 of this tool allows the user to make a full-scale gray balance adjustment to cause the center sub-target (the midtone sub-target 2024) to blend in hue and chroma. This adjustment affects the entire tone scale, with the greatest effect in approximately the midtone (127, 127, 127) and zero effect at white and at black. This effect is very similar to the effect of a typical prior art color balance tool, such as that in Adobe Photo-shop, including the Constant Lightness option of that tool, with the tool used in full-scale mode.

The present tool 2010 also allows the user to then optimize the appearance of each of the other two sub-targets by making gray balance adjustments which primarily affect each of the bottom and top halves of the tone scale, using the darks button 2013 and the lights button 2014, respectively. The object is to make all three sub-targets blend perfectly in hue and chroma. In the case of the tool interface shown, the user merely clicks the button (2012, 2013 or 2014) corresponding to the region of the tone scale he or she wishes to adjust and then moves (by dragging with a computer mouse) the white cross 2015 in the color balance tool 2011 toward the color needed, as far as needed. If the three sub-targets 2004, 2024 and 2045 blend perfectly in lightness as well as hue and chroma, it indicates the absence of a certain degree of incorrect gamma calibration, as well as indicating correct gray balance calibration, though a target with more patches would be required for correct gray balance calibration with a typical LCD flat panel display. The preferred gamma target of the invention, above, is better optimized for verification and setting of the gamma of a display.

The Gray Balance Method Two Target User Controls for the Second Preferred Embodiment The user controls are the same as for the first embodiment, but the instructions must refer to four sub-targets instead of three.

The Gray Balance Method One Target

A preferred embodiment of the Gray Balance Method One target 2100 of the present invention for use at gamma 1.8 is shown in FIG. 11. Preferred embodiments of this target for use at gamma 2.2, for example, differ only by virtue of differing choices of RGB values for the colors of the target, as is the case with all of the prior targets, except for the Contrast target. The Gray Balance Method One target 2100 uses identical structures and tone values to the Gray Balance Method Two target 2000 above—however, the Gray Balance Method One target has split the red, green and blue channels apart and represents each channel as one third of the target: bright red sub targets row 2101, bright green sub-targets row 2102, and bright blue sub-targets row 2103. Each third of the target thus split has only values of zero for the other two channels. For example, the red third of the target, 2101 bright red sub-targets row, has only numerical values of zero for green and blue, and so on. Also, the Gray Balance Method One target need not include a gray scale when the calibration software implementing the invention includes the Gray Balance Method Two target 2000, with gray scale 2006.

The user will simply use a nine-way adjustment tool (itself a split version of the preferred tool for the Gray Balance Method Two target) to adjust the tone curve of each channel. The object is to make the lightness relationships in each channel be the same as in. the other two, and to make the gamma of each channel correct, as indicated by optimal blending of each of the nine sub-targets. This assures correct gray balance, even without the ability of the user to actually see color, since the tool is relying on perception of lightness only.

The target 2100 depicted in FIG. 11 has three rows of three sub-targets each. The top sub-targets row 2101 has three bright red sub-targets, with values such as (100, 0, 0), namely, the three-quartertone (dark) red sub-target 2097, the midtone red sub-target 2104, and the quartertone (light) red sub-target 2107. The middle sub-targets row 2102 has three bright green sub-targets, namely three-quartertone green sub-target 2098, midtone green sub-target 2105 and quartertone green sub-target 2108. The lower row 2103 of three sub-targets is bright blue, namely, three-quartertone blue sub-target 2099, midtone blue sub-target 2106 and quartertone blue sub-target 2109. In every case, the complementary primary colors in each of the nine sub-targets have values of zero. All of the other calibration targets of the invention are made entirely from gray values of equal RGB such as (100, 100, 100).

Thus, the target depicted in FIG. 11 also has three columns, at each of three lightnesses. The left column 2111 of three-quartertone targets 2097, 2098, and 2099 corresponds approximately to the three-quartertone. The center column 2112 corresponds approximately to the midtone. The right column 2113 corresponds approximately to the quartertone.

Each colored sub-target of Gray Balance Method One target 2100 comprises a central solid of the sub-target's primary color surrounded by a blended region of alternating lines of that primary color and lines of black. For example, the three-quartertone red sub-target 2097 has a red solid 2116 surrounded by alternating red lines 2117 and black lines 2118.

Accordingly, the 12 sub-targets of FIGS. 9 and 11 may be generally described as follows. The midtone sub-targets 2024, 2104, 2105 and 2106 are of the heretofore described lined "blended-region-and-solid" type, having a midtone solid (midtone gray, midtone red, midtone green, midtone blue) adjacent to, and preferably surrounded by, a first midtone blended region, the midtone blended region having a series of adjacent double rows of substantially black pixels alternating with a series of single rows of light (white, light red, light green, light blue) pixels. The three-quartertone or dark sub-targets 2004, 2097, 2098 and 2099 have a dark solid (dark gray, dark red, dark green, dark blue) adjacent to a dark blended region, the dark blended region having a series of adjacent double rows of substantially black pixels alternating with a series of single rows of midtone (midtone gray, midtone red, midtone green, midtone blue) pixels. The quartertone or light sub-targets 2045, 2107, 2108 and 2109 have a light solid (light gray, light red, light green, light blue) adjacent to a light blended region, the light blended region having a series of single rows of substantially black pixels alternating with a series of single rows of midtone pixels (midtone or bright gray, midtone red, etc.) and alternating with a third series of single rows of light (white, light red, etc.) pixels. It is understood the terms dark, midtone and light (and even three-quartertone, midtone and quartertone) are somewhat relative, but nevertheless well understood in the context of this invention. Preferred numerical RGB values are stated herein where appropriate.

Figure 12:
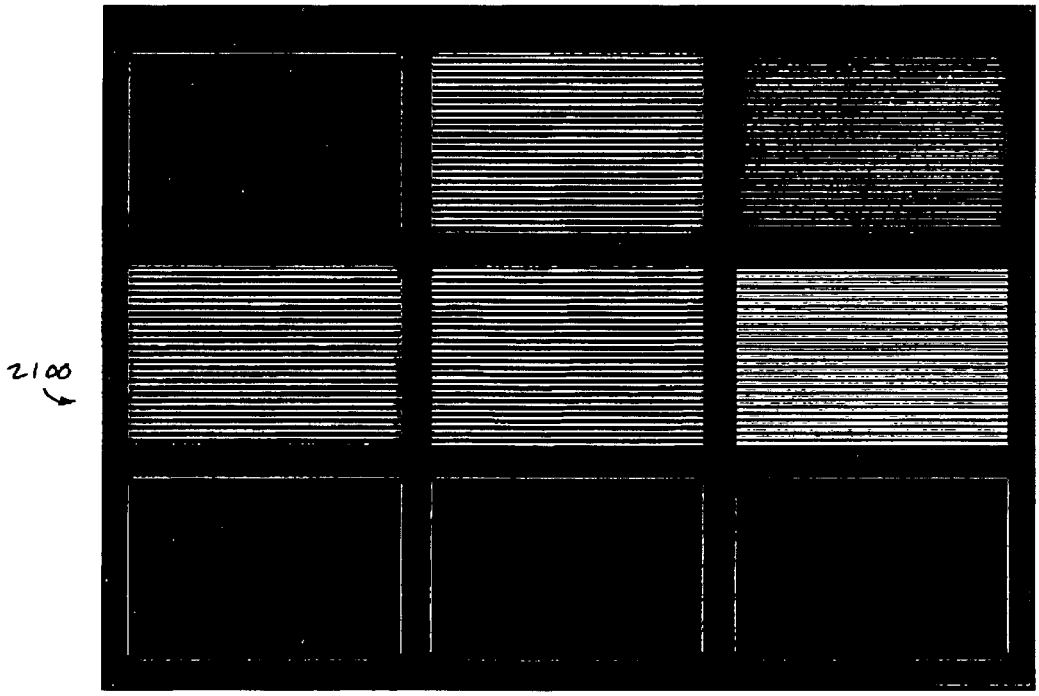
FIG. 12 is a version of the target of FIG. 11, which approximately simulates in a schematic manner the appearance of the target when ideal calibration is completed.

The target depicted in FIG. 12 is a simulation of the blended appearance of the target depicted in FIG. 11 when calibration of gray balance and gamma are perfect.

The Lab Gamma Target

This target (not illustrated) is optional for the calibration process, but improves the reliability of the display system by readily verifying whether the tonality of the display profile matches that of the calibration. To create the target, one need only convert the appropriate Gamma target's RGB data file into CIE Lab data using an accurate conversion through a display profile of the correct tonality. If the gamma being calibrated to is gamma 1.8, then a gamma 1.8 target must be converted into Lab through a gamma 1.8 display profile. No tool is required for use of this target, except that the user should be informed as to the identity of the profile being used for the simulation of the Lab image data in RGB space on the display. There is no separate figure for the Lab Gamma target because its appearance is precisely identical to that of the Gamma target, such as shown in FIG. 13. This is not to imply that its appearance when used for calibration would be precisely identical.

The Calibrating Software in General

A preferred embodiment of the present invention necessarily includes software for calibration of the display, which preferably has several useful features. These include:

Automatic management of the calibration targets which shows the targets together with an appropriate tool interface as the user clicks through a sequence of steps.

Tools to facilitate adjustments of the video card LUTs.

Viewing aids such as lots of neutral-colored surrounding colors to prevent unwanted colors from interfering with visual judgements.

Ways to save and manage user adjustments as discreet settings.

The option to create display profiles by specification, rather than by measurement, so that the software will make appropriate display profiles based on user answers to questions and on stored values for red, green and blue chromaticity.

Options to save and manage the profiles generated by the program and other display profiles on the user's system.

Options to allow the user to calibrate to the most important tone curve standards, such as gamma 1.8 and gamma 2.2

Options to allow the user to calibrate to a wide range of white points if practical.

OPERATION

To use a first preferred embodiment of the invention, one completes the following steps, having reference to FIG. 7 (comprising an Expert Flow Chart):

20) Boot the computer and turn on the display.

40) Disable any conflicting software, which may affect the video LUT or communicate directly with the display's hardware settings.

60) Let the display warm up to stabilize its color output.

80) Launch the visual calibration software.

100) Adjust ambient illumination to subdued levels, with most light behind the plane of the display's front surface, if possible. Allow only ambient light of high color quality and consistency if possible.

120) Begin calibration.

140) Adjust the display's "Color" (white point) setting to best value using factory Gain settings or user settings. This process may involve matching the color of the ambient viewing light and may be done with a colorimeter for verification of the x,y, XYZ, or Kelvin value, or by setting to a factory-saved standard value. This requires the user to adjust the display's built-in controls in most cases.

160) Adjust the display's Bias controls, if any, in concert with Gain settings, if any, to obtain the best gray linearity of the display using these hardware adjustments alone. This process may be done with a calorimeter at this point in the process, or later, with the visual gray balance adjustment steps below, or both.

180) Choose the preferred gamma for calibration from among the gamma values for which calibration targets have been made and are available in the software for use (the Brightness, Gamma, Gray Balance Method One, Gray Balance Method Two, and Lab Gamma targets are gamma-specific). The usual target gammas for display calibration are 1.8 and 2.2. This may involve clicking a button for the desired gamma so that the software knows which target set to display later.

200) Choose a target white point for calibration in the software (typically either 5000K, 6500K or the same color as the preferred color critical viewing light, simply the color of the ambient light, or the native white point of the display, as appropriate). This step is used to determine the correct white point for the display profile that will be built by the software, if any.

220) If not already done in step 140 above, set the hardware white point ("Color") setting in the display's built-in controls, if any, and then indicate the choice made to the software so that the final white point can be automatically adjusted by a predetermined amount in the video LUTs if necessary.

240) Optionally adjust the display's white point by using software adjustments, which have a linear affect on the entire tone scale of each color channel (red, green and blue), with maximum effect at the white end and zero effect at the black end. This kind of adjustment can substitute for user-adjustable Gain controls when setting the final white point to a value different from those available as factory-saved settings in the display itself or those obtainable in steps 200 and 220 above. The adjustment is carried out by moving two of three sliders for two of blue, green or red as needed, while looking at a white area on the screen. The adjustment can also be made by simple numerical entry into a box, by clicking arrows, etc.

260) Adjust the display's Contrast control to maximum or just below maximum for a CRT, depending on user preference and on visual feedback from the Contrast target (see contrast sub-target 2262 of the Gamma 1.8 Brightness and Contrast target 2260, FIG. 18). The contrast level which is appropriate is normally the maximum setting for a CRT. However, sometimes the display appears unnecessarily or uncomfortably bright at the maximum contrast setting, in which case the user may prefer a lower setting, such as 90 out of 100. When calibrated, the contrast sub-target 2262 should appear to contain four distinctly different tones of white and near white values, one in each of tone solids 2269, 2270, 2271 and 2272, with similar amounts of difference between the first and second, the second and third, and the third and fourth solids. Some displays loose hilight tonal separation, usually causing the two brightest steps of the Contrast target to blend and both appear white, when the Contrast control is set at maximum. This may be alleviated by lowering the Contrast setting. Also, a lack of difference between the two lightest steps of the Contrast target can indicate that the video card is set to 16-bit color (thousands of colors) instead of 24-bit or 32-bit color, causing the display to be capable of displaying only 32 levels of gray. This is not enough for proper visual calibration. With flat panel displays, it is often the case that the Contrast control must be set far below maximum to achieve the same desired tonal separation between all four steps of the Contrast sub-target 2262.

280) Adjust the display's Brightness to obtain the correct target appearance. See FIG. 18, office lighting brightness sub-target 2261 and subdued lighting brightness sub-target 2263, and FIG. 19, Gamma 2.2 Brightness target 2275. Choose the appropriate Brightness target for a given desired Gamma, room lighting level and degree of display surface reflection. Then adjust the display's built-in Brightness control up and down until the magnitude of the difference in lightness between the two steps of the darker pair (e.g., tone solids 2264 and 2265) equals the magnitude of the difference in lightness between the two steps of the lighter pair (e.g., tone solids 2266 and 2267). In the figures provided, four steps or solids are present in each target.

Note that the correct setting of the Brightness must be done iteratively with the gamma adjustment. Each adjustment affects the other a lot. Therefore, depending on the amount of correction necessary to obtain correct calibration, one may have to use each target and its respective controls) a few times, switching from adjusting brightness to adjusting gamma and back, before the correct result can be obtained with both simultaneously.

300) Adjust the display's overall Gamma (see FIGS. 13 and 14) to obtain correct target appearance by using the slider in the software, such as the overall slider 2213 pictured, or an equivalent tool interface. Give particular attention to the sub-targets shown in FIG. 13 as 2201, 2205, and 2208. FIG. 13 is suggestive of a possible appearance of the target before adjustment, and FIG. 14 is a simulation of the target after adjustment to the precisely correct overall tone curve. The object of the gamma adjustment is to get all eight of the solid gray regions within the eight sub-targets to blend (perfectly, if possible) with the surrounding lined areas. At this state, the lightness should match precisely, and if the gray balance is correct, the hue and chroma will match also. If the Brightness is not set correctly, it will be impossible to get the darkest 2202 and possibly also the second darkest 2203 of the eight sub-targets to blend well. If the center of the darkest sub-target 2202 or both of the darkest sub-targets 2202 and 2203 are too dark when the rest of the target looks good, turn the Brightness up and vice versa.

320) Re-adjust display's Brightness in light of any Gamma adjustment effects on Brightness (make iterative adjustments of Brightness and overall Gamma until both are correct).

340) Re-adjust display's overall Gamma, in light of Brightness adjustment effects on Gamma (returning to FIGS. 13 and 14). Once overall Gamma and Brightness are both optimized, proceed to step 360.

360) Adjust the display's three-quartertone gamma if needed, using the darks slider 2214 in the software adjustment tool 2212, which slider primarily affects the dark tones between black and the midtone. This Darks slider 2214 causes the greatest movement in the three-quartertone range, and no movement at either black or at the midtone, very little movement between the midtone and white, and none at white. This adjustment offers the option to improve the blending of the second and third darkest sub-targets of the central six sub targets of the Gamma target 2200, namely, sub-target 2203 and sub-target 2204, respectively, with little effect on the rest of the target. Adjust until these sub-targets blend optimally.

380) Adjust the display's quartertone gamma if needed, using the lights slider 2215 in the software adjustment tool 2212, which slider primarily affects the light tones between white and the midtone, with the greatest movement occurring in the quartertone. This adjustment offers the option to improve the blending of the lightest and second lightest of the central six sub-targets of the Gamma target, namely, sub-target 2206 and sub target 2207, respectively, with little effect on the rest of the central six patches. This step may be reversed in sequence with step 360.

400) Adjust the display's overall gray balance by adjusting the gamma of each channel independently (red, green and blue) using the Gray Balance Method One target 2100, with greatest adjustment in the midtone (value 128 in each channel) and no adjustment at maximum or at minimum, i.e. white or black (see FIG. 11). The object of this adjustment is to cause the best overall blending of the central region of each of the nine sub-targets of the target, especially the three midtone sub-targets in column 2112. The lightness of the lined region is to be matched to the lightness of the tone solid within or adjacent to it. First, attempt to make the overall result correct by selecting the Overall button in the software (not shown) and then by moving a slider for each of red, green and blue (not illustrated). Once the blending results in the column of midtone sub-targets 2112 appearing to be as good as this tool will allow (FIG. 12), proceed to step 420.

420) Adjust the three-quartertone (see FIG. 11, item 2111) of each color channel (red, green and blue), after selecting the Darks button (not shown) and moving the sliders for each of red, green and blue, as needed. Again, the object is to give maximum blending in the dark sub-targets in the three-quartertone column 2111, which are most strongly affected by moving the sliders when the Darks button is pushed.

440) Adjust the quartertone (value 192) for each color channel (red, green and blue), as needed (see FIG. 11, quartertone column 2113). First select the Lights button to cause the RGB sliders to access the light end of the tone scale and adjust to give maximum blending in the sub-targets of the quartertone column 2113, which are most strongly affected by moving the sliders when the Lights button is pushed.

Either perform steps 400, 420 and 440, or steps 460, 480 and 500, or both sets of three steps (most likely steps 460, 480 and 500 if only performing one set of three steps, depending on the user's visual preference). Alternatively, as appropriate to the hardware, as when using a high-resolution flat panel display, perform steps 461, 481, and 501 only, or perform these three steps in conjunction with steps 400, 420 and 440.

460) Adjust the display's overall gray balance using the Gray Balance Method Two target 2000, until the central sub-target 2024 blends optimally with respect to hue and chroma. See FIG. 9, where the three sub-targets, namely, three-quartertone sub-target 2004, midtone sub-target 2024 and quartertone sub-target 2045, are arranged from left to right across the bottom of the target drawing and above the user interface for the adjustment tool 2010. Use the color balance tool 2011 by dragging the white cross 2015 toward the color desired until the blend is optimized. This causes the gray balance of the midtones to be correct. Residual gray balance errors may nevertheless remain in the other regions of the tone scale.

Figure 10:
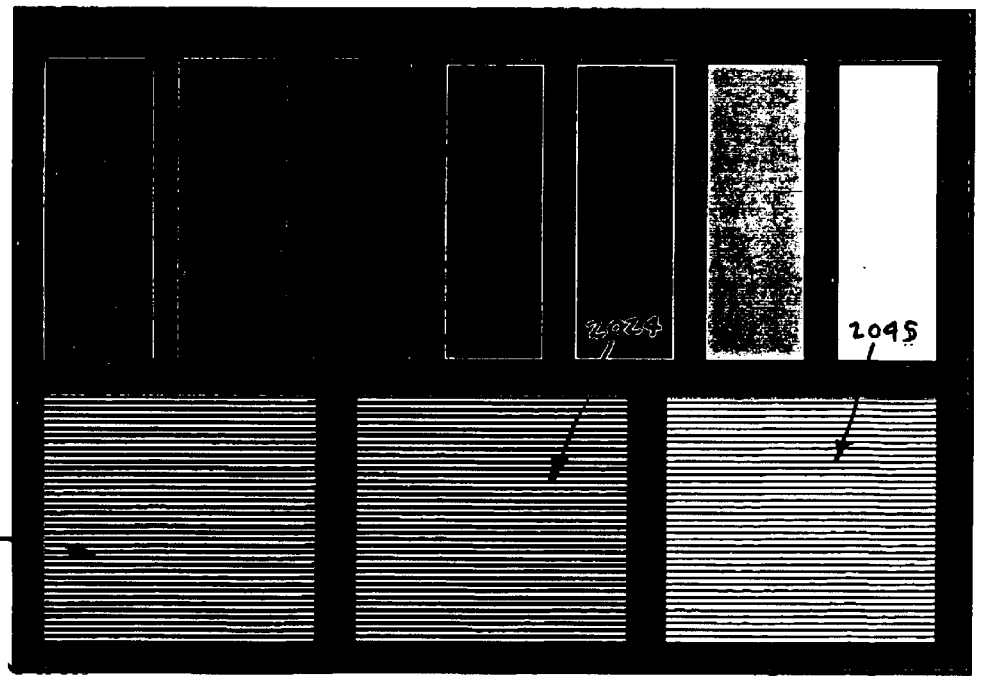
FIG. 10 is a post-calibration version of FIG. 9, which approximately simulates in a schematic manner the appearance of the Gray Balance Method Two target when ideal calibration is completed.

This target 2000 reveals gamma errors as well as gray balance errors, but it is optimized for gray balance error detection and adjustment, just as the Gamma target 2200 is optimized for gamma error detection and adjustment, although the Gamma target also reveals gray balance errors. Note that FIG. 10 shows a kind of simple simulation of the target 2000 after ideal adjustment, because when viewed from a distance the continuous tone gray regions of an actual target appear to disappear or "blend" perfectly with the surrounding lined regions. This and the other schematic simulations (FIGS. 12 and 14) were made by simply replacing the solid continuous tone areas or fields with more of the lined areas to give the appearance of blending for the purpose of the drawings only—in actual practice, the continuous tone fields will always remain solid (they just become difficult to distinguish). FIG. 9 cannot and does not show misadjustment with respect to hue and chroma, because the figures are presented herein in black and white. Proceed to step 480.

461) Alternate step to step 460 for use with Gray Balance Method Two, Increased Precision target 2300 (see FIG. 23). First adjust the midtone and three-quartertone gray balance while referring to midtone sub-target 2303 and three-quartertone sub-target 2302 respectively. Accomplish this by means of making adjustments with the tool of the visual calibration software user interface to the "overall" and "darks" portions of the tone scale, as labeled in the sample interface adjustment tool 2010 shown at the bottom of FIG. 9. Proceed to step 481.

480) Proceed to adjust the gray balance of the dark half of the tone scale, making the three-quartertone sub-target 2004 of the Gray Balance Method Two target 2000 blend optimally with respect to hue and chroma, as needed (see FIG. 9). Select the Darks button 2013 to cause the tool 2010 to access the darker half of the tone scale before beginning. Proceed to step 500.

481) Alternate step to step 480 for use with Gray Balance Method Two, Increased Precision target 2300 (see FIG. 23). Adjust the $5/6^{th}$ tone gray balance while referring to the five-sixths-tone sub-target 2301. Make this adjustment with the "Darks" adjustment button shown in the sample interface and with the Gray Balance curves 2286 of the Curves tool 2285 (FIG. 22) or with an alternate interface designed to facilitate adjustment of the dark end of the tone scale directly. Proceed to step 501.

500) Proceed to adjust the gray balance of the light half of the tone scale, making the right quartertone sub-target 2045 blend optimally with respect to hue and chroma, as needed (see the Gray Balance Method Two target 2000 of FIG. 9). Select the Lights button 2014 to cause the tool 2010 to access the lighter half of the tone scale before beginning adjustment. When all three sub-targets 2004, 2024 and 2045 blend optimally, examine the hue and chroma of the darkest gray patch or solid 2007 of the gray scale 2006 across the top of the target (the step beside the black patch). If any noticeable color cast remains there, despite the three sub-targets and the rest of the gray scale appearing to be neutral, then further adjustment of the deep shadow color should be performed using the Gray Balance curves 2286 of the Curves Tool 2285 (see gray balance button 2284 of FIG. 22). Inspection of the Luminosity curve 2287 in the Curves Tool 2285 (see luminosity button 2288 of FIG. 21) reveals the strength and nature of the overall gamma correction necessary to move the display from its hardware state to the target overall gamma, exclusive of the effects of the gray balance adjustments shown in the Gray Balance curves 2286 of FIG. 22. When finished, proceed to step 520.

501) Alternate step to step 500 for use with Gray Balance Method Two, Increased Precision target 2300 (see FIG. 23). Adjust the quartertone tone gray balance while referring to light tone (roughly quartertone) sub-target 2304. Proceed to step 520.

520) Verify the match between the overall gamma of the calibration with that of the currently active display profile using the Lab Gamma target (not illustrated because it looks identical to the target shown in FIG. 13). The appearance of this target will ideally match that of the earlier Gamma target precisely, indicating a perfect agreement between the tonality described by the display's profile and that of the actual calibration. If there is a substantial degree of mis-match, select a more appropriate display profile for use with the calibration just achieved.

530) Step back through all of the targets to make sure they all look right, and proceed to the next step if they do. If they do not, continue to make-adjustments to any of the above controls until they do.

540) Save calibration adjustments and "lock" the resulting video LUTs into the computer's video card, so that the LUTs will not revert to the LUTs that were present before calibration began. The LUTs will revert to the LUTs that were present before calibration if the calibration is not both completed and accepted by the user.

Figure 21:
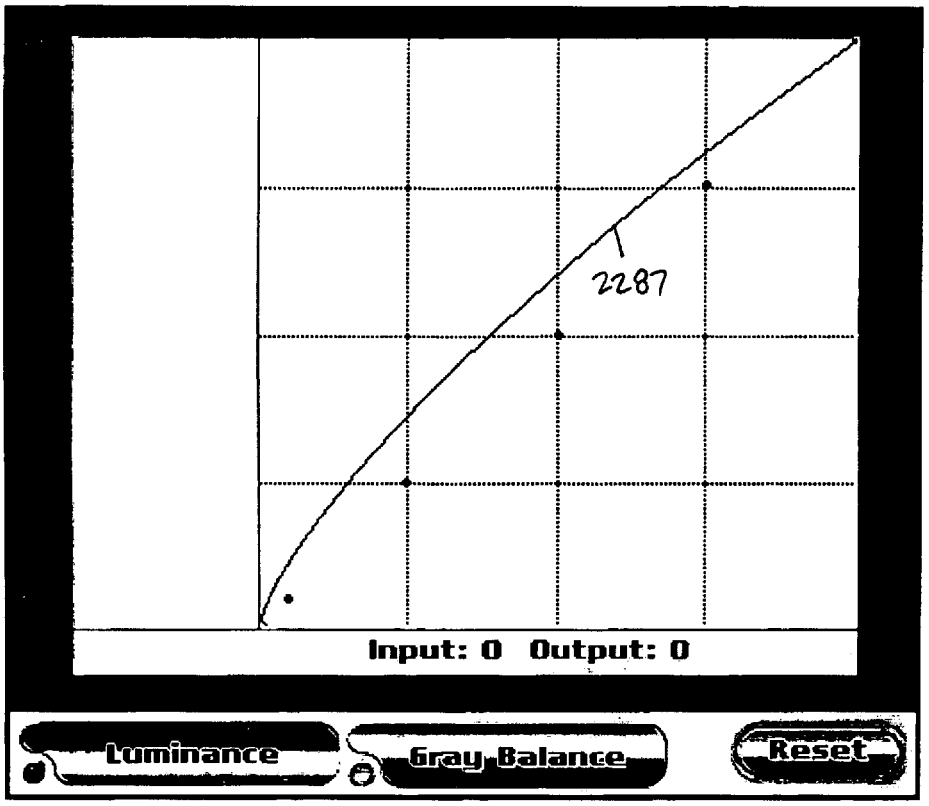
FIGS. 21 and 22 show a luminosity curve and a set of gray balance curves (red plus green plus blue) respectively, which Figures together illustrate the nature of saved user adjustments to the video LUTs from a preferred embodiment of the present invention.
Figure 22:
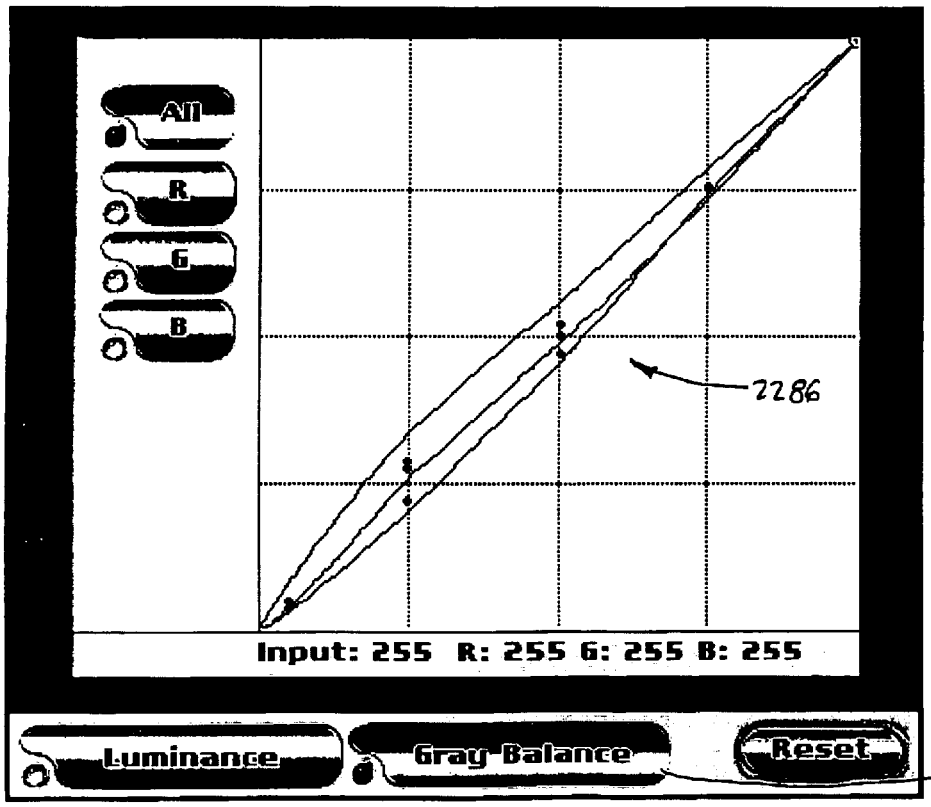

560) Inspect curves which show the effects of the above user adjustments to the video LUTs (see FIGS. 21 and 22). The hardware adjustments to Contrast, Brightness, "Color" (white point), and Gain or Bias do not affect the video LUTs, though they do affect the display's appearance and thus work together with the adjustments to the LUTs to result in correct target appearance and display calibration. Make any adjustments to individual control points on the curves as needed to overcome any perceived imperfection in the calibration not previously dealt with

580) If desired, double check the appearance of all targets now or at any later time to verify correct calibration.

600) Periodically view all targets to verify continued calibration state.

Figure 8:
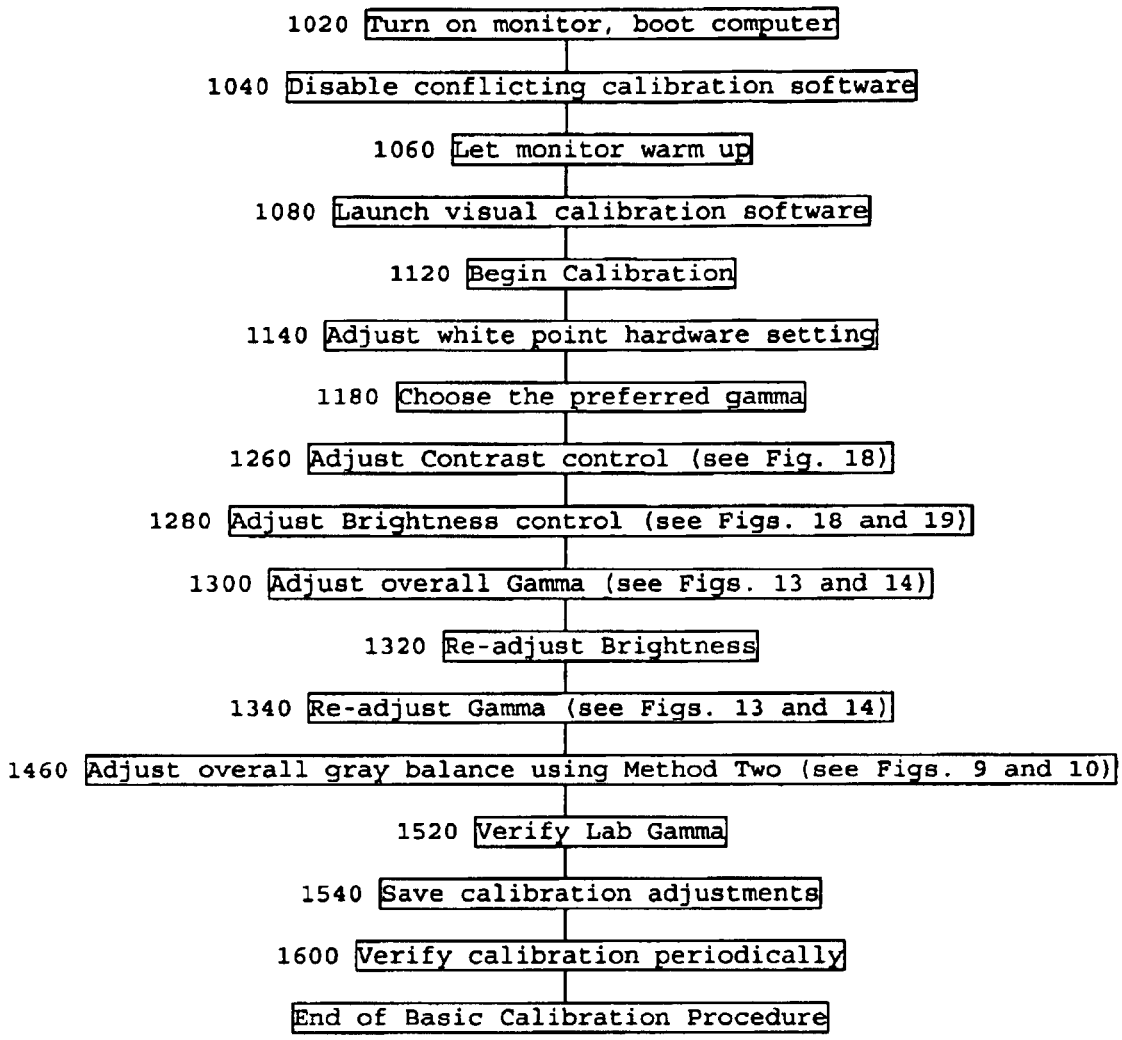
FIG. 8 is a second Flow Chart, showing basic steps of display calibration according to an alternate embodiment of the current invention.

To use a second preferred embodiment of the invention, one completes the following steps, having reference to FIG. 8 (comprising a Basic Flow Chart):

1020) Boot the computer and turn on the display.

1040) Disable any conflicting software, which may affect the video LUT or communicate directly with the display's hardware settings.

1060) Let the display warm up to stabilize its color output.

1080) Launch the visual calibration software.

1120) Begin calibration.

1140) Adjust the display's "Color" (white point) setting to a best value using factory Gain settings or user settings. This process may involve matching the color of the ambient viewing light and may be done with a colorimeter for verification of the x,y, XYZ, or Kelvin value, or by setting to a factory saved standard value. This requires the user to adjust the display's built-in controls in most cases.

1180) Choose the preferred gamma for calibration from among the gamma values for which calibration targets have been made and are available in the software for use (the Brightness, Gamma, Gray Balance Method One, Gray Balance Method Two, and Lab Gamma targets are gamma-specific). The usual target gammas for display calibration are 1.8 and 2.2. This may involve clicking a button for the desired gamma so that the software knows which target set to display later.

1260) Adjust the display's Contrast control to maximum or just below maximum for a CRT, depending on user preference and on visual feedback from the Contrast target (see FIG. 18, contrast sub-target 2262). The contrast level which is appropriate is normally the maximum setting for a CRT, however sometimes the display appears unnecessarily or uncomfortably bright at the maximum contrast setting, in which case the user may prefer a lower setting, such as 90 out of 100 for a CRT. The contrast sub-target 2262 should appear to contain four distinctly different tones of white and near white values, with similar amounts of difference between the first and second, the second and third, and the third and fourth steps (solids 2269, 2270, 2271 and 2272). Some displays loose hilight tonal separation, usually causing the two brightest steps of the Contrast target, 2269 and 2270, to blend and both appear white, when the Contrast control is set at maximum. This may be alleviated by lowering the Contrast setting. Also, a lack of difference between the two lightest steps of the Contrast target, 2269 and 2270, can indicate that the video card is set to 16-bit color (thousands of colors) instead of 24-bit or 32-bit color, causing the display to be capable of displaying only 32 levels of gray. This is not enough for proper visual calibration. With flat panel displays, it is often the case that the Contrast control must be set far below maximum to achieve the same desired tonal separation between all four steps of the Contrast sub-target 2262.

1280) Adjust the display's Brightness to obtain the correct target appearance. See FIG. 18, office lighting brightness sub target 2261 and subdued lighting brightness sub target 2263, and Gamma 2.2 Brightness target 2275 of FIG. 19. Choose the appropriate Brightness target for a given desired Gamma, room lighting level and degree of display surface reflection. Then adjust the display's built-in Brightness control up and down until the magnitude of the difference in lightness between the two steps of the darker pair equals the magnitude of the difference in lightness between the two steps of the lighter pair. In FIGS. 18 and 19, four steps are present in each sub-target 2216 and 2263 or target 2275.

Note that the correct setting of the Brightness must be done iteratively with the gamma adjustment. Each adjustment affects the other a lot. Therefore, depending on the amount of correction necessary to obtain correct calibration, one may have to use each target and its respective control(s) a few times, switching from adjusting brightness to adjusting gamma and back, before the correct result can be obtained with both simultaneously.

1300) Adjust the display's overall Gamma to obtain correct target appearance by using the slider in the software, such as the Overall slider 2213 pictured (see FIGS. 13 and 14). FIG. 13 is suggestive of a possible appearance of the target before adjustment, and FIG. 14 is a simulation of the target after adjustment to the precisely correct overall tone curve. The object of the adjustment is to get all eight of the solid gray regions (e.g., solid 2210 of sub-target 2201) within the eight sub-targets of FIG. 13 to blend (preferably perfectly) with the surrounding lined areas (e.g., lined region 2209 of sub-target 2201). The lightness should match as precisely as practicable, and if the gray balance is correct, the hue and chroma will match also. If the Brightness is not set correctly on a CRT, it will be impossible to get the darkest and possibly also the second darkest of the eight sub-targets to blend well. If the center of the darkest sub-target 2202 or both of the darkest sub-targets 2202 and 2203 are too dark when the rest of the target 2200 looks good, turn the Brightness up and vice versa.

1320) Re-adjust display's Brightness in light of any Gamma adjustment effects on Brightness (make iterative adjustments of Brightness and overall Gamma until both are correct).

1340) Re-adjust display's overall Gamma, in light of Brightness adjustment effects on Gamma (see FIGS. 13 and 14). Once overall Gamma and Brightness are both optimized, proceed to step 1460.

1460) Adjust the display's overall gray balance using the Gray Balance Method Two target 2000, until the central sub target 2024 blends optimally with respect to hue and chroma. Refer to FIG. 9, where the three sub-targets, namely, three-quartertone sub-target 2004, midtone sub-target 2024 and quartertone sub-target 2045, are arranged from left to right across the bottom of the Gray Balance Method Two target 2000 and above the user interface for the adjustment tool 2010. Use the color balance tool 2011 by dragging the white cross 2015 toward the color desired until the blend is optimized.

This target reveals gamma errors as well as gray balance errors, but it is optimized for gray balance error detection and adjustment, just as the Gamma target is optimized for gamma error detection and adjustment, although the Gamma target also reveals gray balance errors. Note that FIG. 10 shows a kind of simple simulation of the Gray Balance Method Two target 2000 after ideal adjustment, because the continuous tone gray regions blend perfectly with the surrounding lined regions. Again, the simulation was made by simply replacing the continuous tone gray area with more of the lined area for the purpose of this drawing only. FIG. 9 cannot and does not show mis-adjustment with respect to hue and chroma, because the figures are presented herein in black and white.

1520) Verify the match between the overall gamma of the calibration with that of the currently active display profile using the Lab Gamma target (not shown because it looks identical to the target shown in FIG. 13). The appearance of this target will ideally match that of the earlier Gamma target precisely, indicating a perfect agreement between the tonality described by the display's profile and that of the actual calibration. If there is a substantial degree of mis-match, select a more appropriate display profile for use with the calibration just achieved.

1540) Save calibration adjustments and "lock" the resulting video LUTs into the computer's video card, so that the LUTs will not revert to the LUTs that were present before calibration began. The LUTs will revert to the LUTs that were present before calibration if the calibration is not both completed and accepted by the user.

1600) Periodically view all targets to verify continued calibration state.

One preferred embodiment of the present invention can be found in the interface of the above-referenced software application, ColorBlind Prove it!. The interface specifies two series of steps, very similar to those above, that are to be followed in a particular sequence, and preferred methods for carrying out each step. Some steps require the use of an adjustment mechanism and a visual target which instructs the user as to the adjustment required. In some cases an adjustment mechanism changes the display's built-in hardware settings and in some cases it changes the video LUTs of the computer. The preferred implementation of the entire visual calibration process necessarily includes optimizing the hardware settings, prior to implementing the software-only portion of the calibration, which makes adjustments to the video card LUTs.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

For example, the exact RGB values chosen to make the targets may vary somewhat while obtaining the same effects. Also, the number of sub-targets in the several visual calibration targets may vary. Also, the kinds of patterns employed to make the various sub-targets may vary to optimize the targets for new kinds of computer displays, such as flat panel displays, including the ability to determine gray balance more accurately and further into the shadows or highlights. Also, the design of the tool interface in the software which allows the user access to the video LUTs can vary considerably and would usually employ such typical interface features as sliders, clickable arrows, numerical entry boxes, movable "handles" of one sort or another, and the like. Displays of improved resolution are in development and will support target designs with different optimizations of the detailed structure of the targets, such as the feasible number of lines in a repeating pattern, which is currently limited to a maximum of three, and Flat Panel Displays may become ubiquitous and negate the necessity for certain design compromises necessitated by the nature of CRT displays. This will likely include the necessity for long, horizontally oriented groups of pixels of identical color value in the targets.

Furthermore, the invention can be practiced with many of the sub-targets discussed herein being presented as a series of individual sub-targets, rather than as a single, combined target with multiple sub-targets. Also, it is possible to use a single sub-target for adjusting both gamma and gray balance, for the sake of simplicity.

Therefore, the above description and illustrations should not be construed as limiting the scope of the invention, which is defamed by the appended claims.

What is claimed is:

[1. An apparatus for calibrating a display associated with stored Lookup Tables, including:

first means for displaying on said display a first midtone sub-target having a first midtone solid adjacent to a first midtone blended region, said first midtone blended region having a first series of adjacent double rows of substantially black pixels alternating with a first series of single rows of light pixels;

second means for displaying on said display a second dark sub-target having a second dark solid adjacent to a second dark blended region, said second dark blended region having a second series of adjacent double rows of substantially black pixels alternating with a second series of single rows of midtone pixels;

third means for displaying on said display a third light sub-target having a third light solid adjacent to a third fight blended region, said third light blended region having a third series of single rows of substantially black pixels alternating with a third series of single rows of midtone pixels and alternating with a third series of single rows of light pixels; and means for modifying said Lookup Tables responsive to changes in said first, second and third sub-targets.]

[2. The apparatus of claim 1 wherein:

said first midtone solid is midtone gray and said first series of single rows of light pixels are white, said second dark solid is dark gray and said second series of single rows of midtone pixels are midtone gray, and said third light solid is light gray and said third series of single rows of midtone pixels are midtone gray and said third series of single rows of light pixels are white.]

[3. The apparatus of claim 2 further including:

means for displaying on said display a gray scale, and wherein said second dark solid is three-quartertone gray and said third light solid is quartertone gray.]

[4. The apparatus of claim 1 wherein:

said first midtone solid is midtone red and said first series of single rows of light pixels are light red, said second dark solid is dark red and said second series of single rows of midtone pixels are midtone red, and said third light solid is light red, said third series of single rows of midtone pixels are midtone red and said third series of single rows of light pixels are light red.]

[5. The apparatus of claim 4 further including:

means for displaying on said display a fourth lined blended-region-and-solid dark green sub-target;

means for displaying on said display a fifth lined blended-region-and-solid midtone green sub-target;

means for displaying on said display a sixth lined blended-region-and-solid light green sub-target;

means for displaying on said display a seventh lined blended-region-and-solid dark blue sub-target;

means for displaying on said display a eighth lined blended-region-and-solid midtone blue sub-target;

means for displaying on said display a ninth lined blended-region-and-solid light blue sub-target; and wherein said means for modifying said LookUp Tables responsive to changes in said first, second and third sub-targets is also responsive to changes in said fourth through ninth sub-targets.]

[6. The apparatus of claim 1 wherein:

said first midtone solid is midtone green and said first series of single rows of light pixels are light green, said second dark solid is dark green and said second series of single rows of midtone pixels are midtone green, and said third light solid is light green, said third series of single rows of midtone pixels are midtone green and said third series of single rows of light pixels are light green.]

[7. The apparatus of claim 6 further including:

means for displaying on said display a fourth lined blended-region-and-solid dark red sub-target;

means for displaying on-said display a fifth lined blended-region-and-solid midtone red sub-target;

means for displaying on said display a sixth lined blended-region-and-solid light red sub-target;

means for displaying on said display a seventh lined blended-region-and-solid dark blue sub-target;

means for displaying on said display a eighth lined blended-region-and-solid midtone blue sub-target;

means for displaying on said display a ninth lined blended-region-and-solid light blue sub-target; and wherein said means for modifying said LookUp Tables responsive to changes in said first, second and third sub targets is also responsive to changes in said fourth through ninth sub-targets.]

[8. The apparatus of claim 1 wherein:

said first midtone solid is midtone blue and said first series of single rows of light pixels are light blue, said second dark solid is dark blue and said second series of single rows of midtone pixels are midtone blue, and said third light solid is light blue, said third series of single rows of midtone pixels are midtone blue and said third series of single rows of light pixels are light blue.]

[9. The apparatus of claim 8 further including:

means for displaying on said display a fourth lined blended-region-and-solid dark green sub-target;

means for displaying on said display a fifth lined blended-region-and-solid midtone green sub-target;

means for displaying on said display a sixth lined blended-region-and-solid light green sub-target;

means for displaying on said display a seventh lined blended-region-and-solid dark red sub-target;

means for displaying on said display a eighth lined blended-region-and-solid midtone red sub-target;

means for displaying on said display a ninth lined blended-region-and-solid light red sub-target; and wherein said means for modifying said LookUp Tables responsive to changes in said first, second and third sub-targets is also responsive to changes in said fourth through ninth sub-targets.]

[10. An apparatus for calibrating a display associated with stored LookUp Tables, including:

first means for displaying on said display a first blended-region-and-solid midtone sub-target;

second means for displaying on said display a second blended-region-and-solid light sub-target;

third means for displaying on said display a third blended-region-and-solid dark sub target, said third dark sub-target having a third dark solid surrounded by a uniform repeating pattern of between one and three white pixels per first group of twelve pixels, the remainder of said first group of twelve pixels being substantially black pixels; fourth means for displaying on said display a fourth blended-region-and-solid very dark sub-target, said fourth very dark sub-target having a fourth very dark solid surrounded by a uniform repeating pattern of between one and three midtone gray pixels per second group of twelve pixels, the remainder of said second group of twelve pixels being substantially black pixels; and means for modifying said LookUp Tables responsive to changes in said first, second, third and fourth sub-targets.]

[11. An apparatus for calibrating a display including:

means for displaying on said display a first brightness tone solid having a first dark tone;

means for displaying on said display a second brightness tone solid having a second dark tone;

means for displaying on said display a third brightness tone solid having a third dark tone; and means for calibrating the brightness of said display by adjusting the relative lightnesses of said brightness tone solids until a first visible degree of lightness difference between a first two of said brightness tone solids substantially equals a second visible degree of lightness difference between a second two of said brightness tone solids.]

[12. The apparatus of claim 11 further including:

means for displaying on said display a fourth brightness tone solid having a fourth dark tone, said first brightness tone solid displayed adjacent to said second brightness tone solid and said third brightness tone solid displayed adjacent to said fourth brightness tone solid, wherein said means for calibrating said brightness of said display calibrates by adjusting the relative lightnesses of said brightness tone solids until a first visible degree of lightness difference between said first and second brightness tone solids substantially equals a second visible degree of lightness difference between said third and fourth brightness tone solids.]

[13. The apparatus of claim 12 further including:

overall slider means for controlling the full tone scale on said display;

darks slider means for controlling the dark half of the tone scale on said display;

lights slider means for controlling the light half of the tone scale on said display; first means for displaying on said display at least one first lined blended-region-and-solid gamma sub-target responsive to adjustments of said overall slider means;

second means for displaying on said display at least one second lined blended-region-and-solid gamma sub-target responsive to adjustments of said darks slider means;

third means for displaying on said display at least one third lined blended-region-and-solid gamma sub-target responsive to adjustments of said lights slider means; and means for calibrating the gamma of said display responsive to changes in said gamma sub targets occasioned by adjustments to said overall slider means, darks slider means and lights slider means.]

[14. The apparatus of claim 13 wherein:

the first, second and third displaying means display a total of eight first, second and third lined blended-region-and-solid gamma sub-targets.]

[15. A system for calibrating a display, including:

a gray balance target produced by said display having at least three blended-region-and-solid gray balance sub-targets and a gray scale;

a brightness target produced by said display having at least a first brightness tone solid having a first dark tone, a second brightness tone solid having a second dark tone, and a third brightness tone solid having a third dark tone;

a gamma target produced by said display having eight lined blended-region-and-solid gamma sub-targets;

at least one target adjustment tool produced by said display; and a video card having LookUp Tables responsive to changes in said gray balance target, said brightness target and said gamma target.]

[16. The system of claim 15 wherein:

said gray balance target includes a first midtone sub-target having a first midtone solid adjacent to a first midtone blended region, said first midtone blended region having a first series of adjacent double rows of substantially black pixels alternating with a first series of single rows of light pixels;

a second dark sub-target having a second dark solid adjacent to a second dark blended region, said second dark blended region having a second series of adjacent double rows of substantially black pixels alternating with a second series of single rows of midtone pixels; and a third light sub-target having a third light solid adjacent to a third light blended region, said third light blended region having a third series of single rows of substantially black pixels alternating with a third series of single rows of midtone pixels and alternating with a third series of single rows of light pixels.]

[17. The system of claim 16 wherein:

said first midtone solid is midtone gray and said first series of single rows of light pixels are white, said second dark solid is dark gray and said second series of single rows of midtone pixels are midtone gray, and said third light solid is light gray and said third series of single rows of midtone pixels are midtone gray and said third series of single rows of light pixels are white.]

[18. A method for calibrating a display including the steps of:

providing LookUp Tables associated with said monitor;

providing a first midtone sub-target having a first midtone solid adjacent to a first midtone blended region, said first midtone blended region having a first series of adjacent double rows of substantially black pixels alternating with a first series of single rows of light pixels;

providing a second dark sub-target having a second dark solid adjacent to a second dark blended region, said second dark blended region having a second series of adjacent double rows of substantially black pixels alternating with a second series of single rows of midtone pixels;

providing a third light sub-target having a third light solid adjacent to a third light blended region, said third light blended region having a third series of single rows of substantially black pixels alternating with a third series of single rows of midtone pixels and alternating with a third series of single rows of light pixels;

adjusting the visual appearance of said first midtone sub-target until said first midtone solid appears to blend with said first midtone blended region;

adjusting the visual appearance of said second dark sub-target until said second dark solid appears to blend with second dark blended region;

adjusting the visual appearance of said third light sub-target until said third fight solid appears to blend with said third light blended region; and saving modifications to said LookUp tables which have occurred as a result of any of the preceding steps.]

[19. The method of claim 18 further including the steps of:

providing a first brightness tone solid having a first dark tone;

providing a second brightness tone solid having a second dark tone;

providing a third brightness tone solid having a third dark tone, providing a fourth brightness tone solid having a fourth dark tone, said first brightness tone solid displayed adjacent to said second brightness tone solid and said third brightness tone solid displayed adjacent to said fourth brightness tone solid; and calibrating the brightness of said display by adjusting the relative lightnesses of said brightness tone solids until a first visible degree of lightness difference between said first and second brightness tone solids substantially equals a second visible degree of lightness difference between said third and fourth brightness tone solids.]

[20. The method of 19 further including the steps of:

providing at least one first lined blended-region-and-solid gamma sub target responsive to adjustments in the full tone scale on said display;

providing at least one second lined blended-region-and-solid gamma sub-target responsive to adjustments in the dark half of the tone scale on said display;

providing at least one third lined blended-region-and-solid gamma sub-target responsive to adjustments in the light half of the tone scale on said display;

adjusting said at least one first lined blended-region-and-solid gamma sub-target until it appears fully blended visually;

adjusting said at least one second lined blended-region-and-solid gamma sub-target until it appears fully blended visually; and adjusting said at least one third lined blended-region-and-solid gamma sub-target until it appears filly blended visually.]

[21. An apparatus for calibrating a display associated with stored LookUp Tables, including:

first means for displaying on said display a first midtone sub-target having a first midtone solid adjacent to a first midtone blended region, said first midtone blended region having a first mixture of substantially black pixels and light pixels;

second means for displaying on said display a second blended-region-and-solid dark sub-target;

third means for displaying on said display a third blended-region-and-solid light sub-target;

overall tone means for adjusting said first midtone LookUp Tables responsive to changes in said first midtone sub-target;

dark tone means for adjusting said second dark sub-target and for modifying said LookUp Tables responsive to changes in said second dark sub-target; and light tone means for adjusting said third light sub-target and for modifying said LookUp Tables responsive to changes in said third light sub-target.]

[22. The apparatus of claim 21 wherein:

said second dark sub-target has a second dark solid adjacent to a second dark blended region, said second dark blended region having a second mixture of substantially black pixels and midtone pixels, and said third light sub-target has a third light solid adjacent to a third light blended region, said third light blended region having a third mixture of substantially black pixels, midtone pixels, and light pixels.]

[23. The apparatus of claim 22 wherein:

said first mixture is of substantially black pixels and white pixels, and said third mixture is of substantially black pixels, midtone pixels, and white pixels.]

[24. The apparatus of claim 21 wherein:

said second dark sub-target has a second dark solid adjacent to a second dark blended region, said second dark blended region having a second mixture of substantially black pixels and light pixels, and said third light sub-target has a third light solid adjacent to a third light blended region, said third light blended region having a third mixture of pixels chosen from the tones black and midtone and of light pixels.]

[25. The apparatus of claim 24 wherein:

said first mixture is of substantially black pixels and white pixels, said second mixture is of substantially black pixels and white pixels, and said third mixture is of pixels chosen from the tones black and midtone and of white pixels.]

[26. The apparatus of claim 22 further including:

fourth means for displaying on said display a fourth very dark sub-target having a fourth very dark solid adjacent to a fourth very dark blended region, said fourth very dark blended region having a mixture of substantially black pixels and midtone pixels.]

*27. An apparatus for calibrating a display associated with stored LookUp Tables, said apparatus including:*

*first means for displaying on said display a first sub-target having a first solid region comprising pixels of first uniform value, said first solid region being substantially adjacent to a first blended region, said first blended region comprising pixels of first alternating values including values which are both higher and lower than the value of the pixels of said first solid region, and said first alternating values including a value which is substantially the maximum and a value which is substantially the minimum;*

*second means for displaying on said display a second sub-target having a second solid region comprising pixels of second uniform value, said second solid region being substantially adjacent to a second blended region, said second blended region comprising pixels of second alternating values, including values which are both higher and lower than the value of the pixels of said second solid region, and further including at least one value which is neither substantially the minimum nor substantially the maximum; and*

*means for sequentially modifying said LookUp Tables so as to modify the appearance of said first and second sub-targets.*

*28. An apparatus for calibrating a display associated with stored LookUp Tables, said apparatus including:*

*first means for displaying on said display a first sub-target having a first solid region comprising pixels of first uniform value, said first solid region being adjacent to a first blended region, said first blended region comprising pixels of first alternating values including values which are both higher and lower than the value of the pixels of said first solid region;*

*second means for displaying on said display a second sub-target having a second solid region comprising pixels of second uniform value, said second solid region being adjacent to a second blended region, said second blended region comprising pixels of second alternating values, including values which are both higher and lower than the value of the pixels of said second solid region, and further including at least one value which is neither substantially the minimum nor substantially the maximum;*

*means for sequentially modifying said LookUp Tables so as to modify the appearance of said first and second sub-targets;*

*first means of adjustment of the appearance of said first sub-target by modifying said LookUp Tables so as to facilitate the user to cause said first solid region to appear to visually blend with said first blended region;*

*second means of adjustment of the appearance of said second sub-target by modifying said LookUp Tables so as to facilitate the user to subsequently cause said second solid region to appear to visually blend with said second blended region;*

*where said blending of said first sub-target assures the validity for calibration of said second sub-target; and*

*where absent said blending of said first sub-target, said second blended region could not be assured of having the correct appearance against which to adjust the appearance of said second solid region so as to achieve accurate calibration at the point in the tone scale of said second solid region.*

*29. The apparatus of claim 27 wherein:*

*said first solid region comprises gray pixels;*

*said second solid region comprises gray pixels; and*

*said second alternating values include at least one value which is neither substantially black nor substantially white.*

*30. The apparatus of claim 28 wherein:*

*said first solid region comprises gray pixels;*

*said second solid region comprises gray pixels; and*

*said second alternating values include at least one value which is neither substantially black nor substantially white.*

*31. The apparatus of claim 29 wherein:*

*said second alternating values include at least one value which is substantially closer to the value of said first solid region than to either the value of white or the value of black.*

*32. The apparatus of claim 30 wherein:*

*said second alternating values include at least one value which is substantially closer to the value of said first solid region than to either the value of white or the value of black.*

*33. The apparatus of claim 30 wherein:*

*said second alternating values include at least one value which is substantially identical to the value of said first solid region.*

*34. The apparatus of claim 27 wherein:*

*said first solid region comprises gray pixels;*

*said first alternating values include both the value of a color which is substantially black and the value of a color which is substantially white;*

*said second solid region comprises gray pixels; and*

*said second alternating values include at least one value which is neither substantially black nor substantially white.*

*35. The apparatus of claim 34 further including:*

*first means of adjustment of the appearance of said first sub-target by modifying said LookUp Tables so as to facilitate the user to cause said first solid region to appear to visually blend with said first blended region by adjusting the gray balance and lightness of said first solid region;*

*second means of adjustment of the appearance of said second sub-target by modifying said LookUp Tables so as to facilitate the user to subsequently cause said second solid region to appear to visually blend with said second blended region by adjusting the gray balance and lightness of said first solid region;*

*where said blending of said first sub-target assures the validity for calibration of said second sub-target; and*

*where absent said blending of said first sub-target, said second blended region could not be assured of having the correct appearance against which to adjust the appearance of said second solid region so as to achieve accurate calibration at the point in the tone scale of said second solid region.*

*36. The apparatus of claim 29 wherein:*

*said second alternating values include at least one value which is substantially identical to the value of said first solid region.*

*37. The apparatus of claim 35 wherein:*

*said second alternating values include at least one value which is substantially identical to the value of said first solid region.*

*38. The apparatus of claim 33 further including:*

*third means for displaying on said display a third sub-target having a third solid region comprising gray pixels of third uniform value, said third solid region being substantially adjacent to a third blended region, said third blended region comprising pixels of third alternating values, including values which are both higher and lower than the value of the pixels of said third solid region, and further including at least one value which is substantially identical to the value of said second solid region; and*

*third means of adjustment of the appearance of said third sub-target so as to facilitate the user to subsequently cause said third solid region to appear to visually blend with said third blended region;*

*where said blending of said second sub-target assures the validity for calibration of said third sub-target; and*

*where absent said blending of said second sub-target, said third blended region could not be assured of having the correct appearance against which to adjust the appearance of said third solid region so as to achieve accurate calibration at the point in the tone scale of said third solid region.*

*39. The apparatus of claim 32 further including:*

*third means for displaying on said display a third sub-target having a third solid region comprising gray pixels of third uniform value, said third solid region being substantially adjacent to a third blended region, said third blended region comprising pixels of third alternating values, including values which are both higher and lower than the value of the pixels of said third solid region, and further including at least one value which is substantially closer to the value of said second solid region than to either the value of white or the value of black; and*

*third means of adjustment of the appearance of said third sub-target so as to facilitate the user to subsequently cause said third solid region to appear to visually blend with said third blended region;*

*where said blending of said second sub-target assures the validity for calibration of said third sub-target; and*

*where absent said blending of said second sub-target, said third blended region could not be assured of having the correct appearance against which to adjust the appearance of said third solid region so as to achieve accurate calibration at the point in the tone scale of said third solid region.*

*40. The apparatus of claim 27 wherein:*

*said first sub-target is a first red sub-target;*

*said first solid region is a first red solid region comprising red pixels of first uniform value;*

*said second sub-target is a second red sub-target;*

*said second solid region is a second red solid region comprising red pixels of second uniform value; and*

*said second alternating values include at least one value which is substantially closer to the value of said first solid region than to either the value of maximum red or the value of black.*

*41. The apparatus of claim 40 wherein:*

*said second alternating values include at least one value which is substantially identical to the value of said first solid region.*

*42. The apparatus of claim 40 further including:*

*third means for displaying on said display a third green sub-target having a third green solid region comprising green pixels of third uniform value, said third green solid region being substantially adjacent to a third blended region, said third blended region comprising pixels of third alternating values, including values which are both higher and lower than the value of the pixels of said third green solid region;*

*fourth means for displaying on said display a fourth green sub-target having a fourth green solid region comprising green pixels of fourth uniform value, said fourth green solid region being substantially adjacent to a fourth blended region, said fourth blended region comprising pixels of fourth alternating values, including values which are both higher and lower than the value of the pixels of said fourth green solid region, and further including at least one value which is substantially closer to the value of said third green solid region than to either the value of maximum green or the value of black;*

*fifth means for displaying on said display a fifth blue sub-target having a fifth blue solid region comprising blue pixels of fifth uniform value, said fifth blue solid region being substantially adjacent to a fifth blended region, said fifth blended region comprising pixels of fifth alternating values, including values which are both higher and lower than the value of the pixels of said fifth blue solid region;*

*sixth means for displaying on said display a sixth blue sub-target having a sixth blue solid region comprising blue pixels of sixth uniform value, said sixth blue solid region being substantially adjacent to a sixth blended region, said sixth blended region comprising pixels of sixth alternating values, including values which are*

*both higher and lower than the value of the pixels of said sixth blue solid region, and further including at least one value which is substantially closer to the value of said fifth blue solid region than to either the value of maximum blue or the value of black; and*

*means for sequentially modifying said LookUp Tables so as to modify the appearance of said first red sub-target then subsequently modify the appearance of said second red sub-target, modify the appearance of said third green sub-target then subsequently modify the appearance of said fourth green sub-target, and modify the appearance of said fifth blue sub-target then subsequently modify the appearance of said sixth blue sub-target.*

*43. The apparatus of claim 41 further including:*

*third means for displaying on said display a third green sub-target having a third green solid region comprising green pixels of third uniform value, said third green solid region being substantially adjacent to a third blended region, said third blended region comprising pixels of third alternating values, including values which are both higher and lower than the value of the pixels of said third green solid region, and which third alternating values include values which are substantially maximum green and substantially black;*

*fourth means for displaying on said display a fourth green sub-target having a fourth green solid region comprising green pixels of fourth uniform value, said fourth green solid region being substantially adjacent to a fourth blended region, said fourth blended region comprising pixels of fourth alternating values, including values which are both higher and lower than the value of the pixels of said fourth green solid region, and further including at least one value which is which is substantially identical to the value of said third green solid region;*

*fifth means for displaying on said display a fifth blue sub-target having a fifth blue solid region comprising blue pixels of fifth uniform value, said fifth blue solid region being substantially adjacent to a fifth blended region, said fifth blended region comprising pixels of fifth alternating values, including values which are both higher and lower than the value of the pixels of said fifth blue solid region, and which fifth alternating values include values which are substantially maximum blue and substantially black;*

*sixth means for displaying on said display a sixth blue sub-target having a sixth blue solid region comprising blue pixels of sixth uniform value, said sixth blue solid region being substantially adjacent to a sixth blended region, said sixth blended region comprising pixels of sixth alternating values, including values which are both higher and lower than the value of the pixels of said sixth blue solid region, and further including at least one value which is which is substantially identical to the value of said fifth blue solid region; and*

*means for sequentially modifying said LookUp Tables so as to modify the appearance of said first red sub-target then subsequently modify the appearance of said second red sub-target, modify the appearance of said third green sub-target then subsequently modify the appearance of said fourth green sub-target, and modify the appearance of said fifth blue sub-target then subsequently modify the appearance of said sixth blue sub-target.*

*44. The apparatus of claim 30 further including:*

*saving modifications to said LookUp Tables which have occurred as a result of said user blending adjustments.*

*45. The apparatus of claim 40 further including:*

*first lightness adjustment of said first red solid region so as to cause it to match the apparent lightness of said first blended region;*

*subsequent second lightness adjustment of said second red solid region so as to cause it to match the apparent lightness of said second blended region; and*

*saving modifications to said LookUp Tables which have occurred as a result of said first and second lightness adjustments.*

*46. The apparatus of claim 31 further including:*

*first lightness and gray balance adjustment of said first solid region so as to cause it to match the apparent lightness and gray balance of said first blended region and therefore appear to blend;*

*subsequent second lightness and gray balance adjustment of said second solid region so as to cause it to match the apparent lightness and gray balance of said second blended region and therefore appear to blend; and*

*saving modifications to said LookUp Tables which have occurred as a result of said first and second lightness and gray balance adjustments.*

*47. The apparatus of claim 36 further including:*

*first lightness and gray balance adjustment of said first solid region so as to cause it to match the apparent lightness and gray balance of said first blended region and therefore appear to blend;*

*subsequent second lightness and gray balance adjustment of said second solid region so as to cause it to match the apparent lightness and gray balance of said second blended region and therefore appear to blend; and*

*saving modifications to said LookUp Tables which have occurred as a result of said first and second lightness and gray balance adjustments.*

*48. The apparatus for calibrating a display associated with stored LookUp Tables of claim 27 further including:*

*third means for displaying on said display a third sub-target having a third dark gray solid region comprising dark gray pixels of third uniform value, said third dark gray solid region being substantially adjacent to a third blended region, said third blended region comprising pixels of third alternating values in a third repeating pattern of light pixels and dark pixels, not more than one-fourth of the pixels of said third repeating pattern being light; and*

*means for modifying said LookUp Tables so as to modify the appearance of said third sub-target.*

*49. The apparatus of claim 48 wherein:*

*said third blended region comprises pixels of third alternating values in a third repeating pattern of substantially white pixels and substantially black pixels, not more than one-fourth of the pixels of said third repeating pattern being substantially white.*

*50. The apparatus for calibrating a display associated with stored LookUp Tables of claim 27 further including:*

*third means for displaying on said display a third sub-target having a third midtone-to-light-gray solid region comprising midtone-to-light-gray pixels of third uniform value, said third midtone-to-light-gray solid region being substantially adjacent to a third blended region, said third blended region comprising pixels of third alternating values in a third repeating pattern of*

*dark pixels and light pixels, not more than one-third of the pixels of said third repeating pattern being dark, said third repeating pattern not being a pattern consisting exclusively of horizontal lines; and*

*means for modifying said LookUp Tables so as to modify the appearance of said third sub-target.*

*51. The apparatus of claim 50 wherein:*

*said third repeating pattern is a pattern of substantially black pixels and substantially white pixels, not more than one-third of the pixels of said first repeating pattern being substantially black.*

*52. The apparatus of claim 27 wherein:*

*said first solid region is a gray solid region comprising pixels of first uniform value;*

*said second sub-target is a dark sub-target;*

*said second solid region is a dark gray solid region;*

*said second blended region has a uniform repeating pattern of substantially midtone pixels and dark pixels, not more than one-fourth of the pixels of said first repeating pattern being substantially midtone; and*

*said first repeating pattern not being a pattern consisting exclusively of horizontal lines.*

*53. The apparatus of claim 52 wherein said second blended region has a uniform repeating pattern of substantially midtone pixels and substantially black pixels, not more than one-fourth of the pixels of said first repeating pattern being substantially midtone.*

*54. The apparatus of claim 27 wherein:*

*said first solid region is a gray solid region comprising pixels of first uniform value;*

*said second sub-target is a light sub-target;*

*said second solid region is a light gray solid region;*

*said second blended region has a uniform repeating pattern of substantially midtone pixels and light pixels, not more than one-fourth of the pixels of said first repeating pattern being substantially midtone; and*

*said first repeating pattern not being a pattern consisting exclusively of horizontal lines.*

*55. The apparatus of claim 54 wherein:*

*said second blended region has a uniform repeating pattern of substantially midtone pixels and substantially white pixels.*

*56. An apparatus for verifying the calibration state of a display, said apparatus including:*

*first means for displaying on said display a first red sub-target having a first solid region comprising pixels of first uniform red value, said first solid region being substantially adjacent to a first blended region, said first blended region comprising pixels of first alternating values including values which are both higher and lower than the value of the pixels of said first solid region, and which first alternating values include values which are substantially maximum red and substantially black; and*

*second means for displaying on said display a second red sub-target having a second solid region comprising pixels of second uniform red value, said second solid region being substantially adjacent to a second blended region, said second blended region comprising pixels of second alternating values including values which are both higher and lower than the value of the pixels of said second solid region, and further including at least one value which is substantially closer to the value of said first solid region than to either maximum red or black.*

*57. An apparatus for verifying the calibration state of a display, said apparatus including:*

*first means for displaying on said display a first gray sub-target having a first gray solid region comprising pixels of first uniform value, said first solid region being substantially adjacent to a first blended region, said first blended region comprising pixels of first alternating values including values which are both substantially white and substantially black;*

*second means for displaying on said display a second gray sub-target having a second gray solid region comprising pixels of second uniform value, said second solid region being substantially adjacent to a second blended region, said second blended region comprising pixels of second alternating values comprising values which are both higher and lower than the value of the pixels of said second solid region, and further including at least one value which is substantially closer to the value of said first gray solid region than to either white or black; and*

*third means for displaying on said display a third gray sub-target having a third gray solid region comprising pixels of third uniform gray value, said third gray solid region being substantially adjacent to a third blended region, said third blended region comprising pixels of third alternating values including values which are both higher and lower than the value of the pixels of said third solid region and further including values which are both substantially white and substantially black.*

*58. The apparatus of claim 57 wherein:*

*said second alternating values include at least one value which is substantially identical to the value of said first solid region.*

*59. An apparatus for verifying the calibration state of a display, said apparatus including:*

*first means for displaying on said display a first gray sub-target having a first gray solid region comprising pixels of first uniform value, said first solid region being substantially adjacent to a first blended region, said first blended region comprising pixels of first alternating values including values which are both white and black;*

*second means for displaying on said display a second gray sub-target having a second gray solid region comprising pixels of second uniform value, said second solid region being substantially adjacent to a second blended region, said second blended region comprising pixels of second alternating values comprising values which are both higher and lower than the value of the pixels of said second solid region, and further including at least one value which is substantially closer to the value of said first gray solid region than to either white or black; and*

*third means for displaying on said display a third gray sub-target having a third gray solid region comprising pixels of third uniform gray value, said third gray solid region being substantially adjacent to a third blended region, said third blended region comprising pixels of third alternating values including values which are both higher and lower than the value of the pixels of said third solid region and further including values which are both substantially closer to the value of said second gray solid region than to either white or black.*

*60. An apparatus for verifying the calibration state of a display, said apparatus including:*

*first means for displaying on said display a first gray sub-target having a first gray solid region comprising pixels of first uniform value, said first solid region being substantially adjacent to a first blended region, said first blended region comprising pixels of first alternating values including values which are both substantially white and substantially black;*

*second means for displaying on said display a second gray sub-target having a second gray solid region comprising pixels of second uniform value, said second solid region being substantially adjacent to a second blended region, said second blended region comprising pixels of second alternating values comprising values which are both higher and lower than the value of the pixels of said second solid region, and further including at least one value which is substantially identical to the value of said first gray solid region; and*

*third means for displaying on said display a third gray sub-target having a third gray solid region comprising pixels of third uniform gray value, said third gray solid region being substantially adjacent to a third blended region, said third blended region comprising pixels of third alternating values including values which are both higher and lower than the value of the pixels of said third solid region and further including values which is substantially identical to the value of said second gray solid region.*

*61. The apparatus of claim 60 wherein:*

*said second alternating values include at least one value which is identical to the value of said first solid region.*

* * * * *